US011089519B2

(12) United States Patent
Hampel et al.

(10) Patent No.: US 11,089,519 B2
(45) Date of Patent: Aug. 10, 2021

(54) MIGRATION OF LOCAL GATEWAY FUNCTION IN CELLULAR NETWORKS

(71) Applicant: QUALCOMM Incorporated, San Diego, CA (US)

(72) Inventors: Karl Georg Hampel, New York, NY (US); Vincent Douglas Park, Budd Lake, NJ (US); Hong Cheng, Basking Ridge, NJ (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 15/266,733

(22) Filed: Sep. 15, 2016

(65) Prior Publication Data
US 2017/0303169 A1 Oct. 19, 2017

Related U.S. Application Data

(60) Provisional application No. 62/322,096, filed on Apr. 13, 2016.

(51) Int. Cl.
*H04W 36/00* (2009.01)
*H04W 76/12* (2018.01)
(Continued)

(52) U.S. Cl.
CPC ..... *H04W 36/0011* (2013.01); *H04L 12/2801* (2013.01); *H04W 36/0016* (2013.01);
(Continued)

(58) Field of Classification Search
CPC .............................. H04W 36/0016
See application file for complete search history.

(56) References Cited

U.S. PATENT DOCUMENTS

| 6,954,797 | B1 * | 10/2005 | Takeda | H04L 29/06 709/226 |
| 7,916,715 | B2 * | 3/2011 | Rezaiifar | H04W 68/12 370/352 |

(Continued)

FOREIGN PATENT DOCUMENTS

| CN | 103517362 A | 1/2014 |
| CN | 103636257 A | 3/2014 |

(Continued)

OTHER PUBLICATIONS

ISA/EP, International Search Report and Written Opinion of the International Searching Authority, Int'l Application No. PCT/US2017/020970, dated May 15, 2017, European Patent Office, Rijswijk, NL, 18 pgs.

*Primary Examiner* — Andrew Lai
*Assistant Examiner* — Andrew C Lee
(74) *Attorney, Agent, or Firm* — Holland & Hart LLP

(57) ABSTRACT

Methods, systems, and devices for wireless communication are described. A user equipment (UE) may establish a packet data network (PDN)-connectivity session to a PDN using a cellular radio access technology (RAT) and migrate the PDN-connectivity session from a source access node (AN) to a target AN. Migration may initiate when a decision to perform a handover is made. The target AN may receive a network address and information about a first data radio link established between the UE and source AN. The target AN may establish a second data radio link with the UE based at least in part on the first data radio link information, and may transmit, to the PDN, a path update including the network address and an updated path via the target AN. In some cases, the target AN may forward packets between the UE and the PDN via the second data radio link.

28 Claims, 22 Drawing Sheets

(51) Int. Cl.
*H04L 12/28* (2006.01)
*H04W 36/12* (2009.01)

(52) U.S. Cl.
CPC ... *H04W 36/0061* (2013.01); *H04W 36/0066* (2013.01); *H04W 76/12* (2018.02); *H04W 36/125* (2018.08)

(56) References Cited

U.S. PATENT DOCUMENTS

| | | | | |
|---|---|---|---|---|
| 8,295,830 B1* | 10/2012 | Faccin | H04L 65/1016 | 455/432.1 |
| 8,432,871 B1* | 4/2013 | Sarnaik | H04W 28/0289 | 370/331 |
| 8,467,782 B1* | 6/2013 | Faccin | H04L 65/1073 | 455/432.1 |
| 8,478,886 B2* | 7/2013 | Deshpande | H04L 65/80 | 709/228 |
| 8,498,268 B1* | 7/2013 | Faccin | H04W 36/0011 | 370/331 |
| 8,503,405 B1* | 8/2013 | Wingo | H04B 7/216 | 370/335 |
| 8,780,800 B2* | 7/2014 | Bachmann | H04W 8/065 | 370/328 |
| 8,804,518 B2* | 8/2014 | Manpuria | H04W 36/0011 | 370/235 |
| 9,155,008 B2 | 10/2015 | Parekh | | |
| 9,357,571 B2* | 5/2016 | Gao | H04W 84/045 | |
| 9,967,781 B2* | 5/2018 | Xu | H04W 36/0016 | |
| 9,967,782 B2* | 5/2018 | Hori | H04W 36/14 | |
| 2002/0046277 A1* | 4/2002 | Barna | H04L 12/14 | 709/224 |
| 2003/0028806 A1* | 2/2003 | Govindarajan | H04L 63/0254 | 726/4 |
| 2008/0310369 A1* | 12/2008 | Pan | H04W 36/0016 | 370/331 |
| 2009/0175239 A1* | 7/2009 | Grinshpun | H04W 36/28 | 370/331 |
| 2010/0027448 A1* | 2/2010 | Puthiyandyil | H04W 76/15 | 370/310 |
| 2010/0040018 A1* | 2/2010 | Appani | H04W 36/0033 | 370/331 |
| 2010/0199332 A1* | 8/2010 | Bachmann | H04L 63/164 | 726/4 |
| 2010/0322163 A1 | 12/2010 | Bhalla et al. | | |
| 2011/0096660 A1* | 4/2011 | Ikeda | H04W 36/36 | 370/225 |
| 2011/0170517 A1* | 7/2011 | Bakker | H04W 36/125 | 370/331 |
| 2011/0171953 A1* | 7/2011 | Faccin | H04W 48/08 | 455/426.1 |
| 2011/0199915 A1* | 8/2011 | Santhanam | H04W 36/0011 | 370/252 |
| 2011/0200010 A1 | 8/2011 | Hu et al. | | |
| 2011/0211559 A1* | 9/2011 | Lim | H04W 36/02 | 370/331 |
| 2011/0216743 A1* | 9/2011 | Bachmann | H04L 63/164 | 370/331 |
| 2011/0235595 A1* | 9/2011 | Mehta | H04W 8/082 | 370/329 |
| 2011/0299463 A1* | 12/2011 | Bachmann | H04W 8/065 | 370/328 |
| 2012/0033581 A1* | 2/2012 | Torres Ramon | H04L 12/14 | 370/253 |
| 2012/0177003 A1* | 7/2012 | Chan | H04W 36/0066 | 370/331 |
| 2012/0204253 A1* | 8/2012 | Sugimoto | H04L 63/08 | 726/12 |
| 2012/0307687 A1* | 12/2012 | Zhang | H04W 68/005 | 370/259 |
| 2012/0307802 A1* | 12/2012 | Bhalla | H04W 12/04 | 370/331 |
| 2013/0003697 A1* | 1/2013 | Adjakple | H04W 40/34 | 370/331 |
| 2013/0044709 A1* | 2/2013 | Adjakple | H04W 76/15 | 370/329 |
| 2013/0052995 A1* | 2/2013 | Shi | H04L 12/6418 | 455/411 |
| 2013/0054800 A1* | 2/2013 | Fernandez Alonso | H04L 67/2842 | 709/224 |
| 2013/0083773 A1* | 4/2013 | Watfa | H04W 36/0033 | 370/331 |
| 2013/0121255 A1* | 5/2013 | Wang | H04W 36/0022 | 370/328 |
| 2013/0124255 A1* | 5/2013 | Patterson | G06Q 10/06 | 705/7.27 |
| 2013/0308527 A1* | 11/2013 | Chin | H04W 36/0022 | 370/328 |
| 2014/0064249 A1 | 3/2014 | Lee et al. | | |
| 2014/0126486 A1* | 5/2014 | Brequigny | H04L 65/1069 | 370/329 |
| 2014/0140322 A1* | 5/2014 | Brequigny | H04W 48/17 | 370/331 |
| 2014/0160940 A1* | 6/2014 | Maehara | H04W 28/08 | 370/237 |
| 2015/0009880 A1 | 1/2015 | Zhang et al. | | |
| 2015/0109930 A1* | 4/2015 | Duan | H04L 47/2441 | 370/235 |
| 2015/0117209 A1* | 4/2015 | Lee | H04L 45/70 | 370/235 |
| 2015/0296424 A1* | 10/2015 | Xu | H04W 36/0033 | 370/331 |
| 2015/0382393 A1 | 12/2015 | Kiss | | |
| 2016/0073318 A1* | 3/2016 | Aguirre | H04W 36/32 | 455/436 |
| 2016/0165499 A1* | 6/2016 | Xu | H04W 36/02 | 370/331 |
| 2016/0277956 A1* | 9/2016 | Lindheimer | H04W 36/30 | |
| 2016/0323805 A1* | 11/2016 | Ryu | H04W 36/0055 | |

FOREIGN PATENT DOCUMENTS

| | | |
|---|---|---|
| WO | WO-2008118994 A2 | 10/2008 |
| WO | WO-2014090012 A1 | 6/2014 |

* cited by examiner

MIGRATION OF LOCAL GATEWAY FUNCTION IN CELLULAR NETWORKS

CROSS REFERENCES

The present Application for Patent claims priority to U.S. Provisional Patent Application No. 62/322,096 by Hampel, et al., entitled "Migration of Local Gateway Function in Cellular Networks," filed Apr. 13, 2016, assigned to the assignee hereof, and is hereby expressly incorporated by reference herein in its entirety.

BACKGROUND

The following relates generally to wireless communication, and more specifically to migration of a local gateway function.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency-division multiple access (OFDMA) systems. A wireless multiple-access communications system may include a number of base stations, each simultaneously supporting communication for multiple communication devices, which may each be referred to as a user equipment (UE).

Conventional cellular packet-access systems use centralized anchor nodes (such as packet data network (PDN) gateways (PDN-GWs)) to enable session continuity when a mobile device changes its access point. This may result in a triangular routing problem when the mobile device is connected to a foreign access point that is far from a home access point. In that scenario, packets destined for the mobile device are first routed to the home access point and then tunneled to the foreign access point. This lengthy path caused by the triangular routing problem results in undesired latency. To overcome the triangular routing problem, local gateways (LGWs) have been introduced to optimize the routing path, but have the disadvantage of sacrificing mobility support. It would be desirable to have a solution for cellular packet-access systems that permits shortest-path routing while retaining mobility support.

SUMMARY

A user equipment (UE) may establish a packet data network (PDN)-connectivity session to a PDN using a cellular radio access technology (RAT) and may migrate the PDN-connectivity session from a source access node (AN) to a target AN. Migration may initiate when a decision to perform a handover is made. Target AN may receive a network address and information about a first data radio link established between the UE and source AN. Target AN may establish a second data radio link with the UE based at least in part on the first data radio link information. Target AN may transmit, to the PDN, a path update comprising the network address and an updated path via the target AN. Target AN may forward packets between the UE and the PDN via the second data radio link.

A method of wireless communication is described. The method may include receiving, by a target AN, information about a first data session between a UE and a PDN, determining, by the target AN, to establish a second data session with the UE based at least in part on the information about the first data session, and transmitting a request to a network node to establish the second data session corresponding to the first data session at the target AN.

An apparatus for wireless communication is described. The apparatus may include means for receiving, by a target AN, information about a first data session between a user equipment UE and a PDN, means for determining, by the target AN, to establish a second data session with the UE based at least in part on the information about the first data session, and means for transmitting a request to a network node to establish the second data session corresponding to the first data session at the target AN.

Another apparatus is described. The apparatus may include a processor, memory in electronic communication with the processor, and instructions stored in the memory. The instructions may be operable to cause the processor to receive, by a target AN, information about a first data session between a UE and a PDN, determine, by the target AN, to establish a second data session with the UE based at least in part on the information about the first data session, and transmit a request to a network node to establish the second data session corresponding to the first data session at the target AN.

A non-transitory computer readable medium for wireless communication is described. The non-transitory computer-readable medium may include instructions to cause a processor to receive, by a target AN, information about a first data session between a UE and a PDN, determine, by the target AN, to establish a second data session with the UE based on the information about the first data session, and transmit a request to a network node to establish the second data session corresponding to the first data session at the target AN.

Some examples of the method, apparatus, or non-transitory computer-readable medium described above may further include processes, features, means, or instructions for establishing, by the target AN, a data radio link with the UE based on the information about the first data session. Some examples of the method, apparatus, or non-transitory computer-readable medium described above may further include processes, features, means, or instructions for transmitting, to the PDN, a path update comprising a network address of the UE, an indication of an updated path via the target AN, and information about the data radio link. Some examples of the method, apparatus, or non-transitory computer-readable medium described above may further include processes, features, means, or instructions for forwarding, by the target AN, packets comprising the network address between the UE and the PDN via the data radio link.

In some examples of the method, apparatus, or non-transitory computer-readable medium described above, the path update is sent to at least one next-hop peer AN. In some examples of the method, apparatus, or non-transitory computer-readable medium described above, the path update is one of a multicast message, a broadcast message, a routing message, and a local area network (LAN) signaling message.

Some examples of the method, apparatus, or non-transitory computer-readable medium described above may further include processes, features, means, or instructions for processing a network identifier to confirm that a source AN and the target AN are each configured to provide access to the PDN, where the source AN is configured to exchange packets with the UE via the first data session.

Some examples of the method, apparatus, or non-transitory computer-readable medium described above may further include processes, features, means, or instructions for establishing a tunnel to a source AN. Some examples of the method, apparatus, or non-transitory computer-readable medium described above may further include processes, features, means, or instructions for receiving packets that comprise a network address of the UE via the tunnel.

Some examples of the method, apparatus, or non-transitory computer-readable medium described above may further include processes, features, means, or instructions for establishing a data radio link with a second UE. Some examples of the method, apparatus, or non-transitory computer-readable medium described above may further include processes, features, means, or instructions for forwarding packets comprising a network address of the second UE to the data radio link.

Some examples of the method, apparatus, or non-transitory computer-readable medium described above may further include processes, features, means, or instructions for determining to handover the second UE to a peer AN. Some examples of the method, apparatus, or non-transitory computer-readable medium described above may further include processes, features, means, or instructions for forwarding, to the peer AN, information about the data radio link and the network address.

Some examples of the method, apparatus, or non-transitory computer-readable medium described above may further include processes, features, means, or instructions for processing a network identifier to confirm that the target AN and the peer AN are each configured to provide access to the PDN. Some examples of the method, apparatus, or non-transitory computer-readable medium described above may further include processes, features, means, or instructions for establishing a tunnel with the peer AN. Some examples of the method, apparatus, or non-transitory computer-readable medium described above may further include processes, features, means, or instructions for forwarding packets that comprise the network address of the second UE to the peer AN via the tunnel.

In some examples of the method, apparatus, or non-transitory computer-readable medium described above, the information about the first data session comprises a network address of the UE and is received from a source AN, a core network, or the UE via a signaling radio link. In some examples of the method, apparatus, or non-transitory computer-readable medium described above, the PDN is an Internet Protocol (IP) network and the UE has an IP address. In some examples of the method, apparatus, or non-transitory computer-readable medium described above, the PDN is a local area network (LAN) and the UE has a physical address.

A method of wireless communication is described. The method may include establishing, by a UE, a first data radio link with a source AN, establishing, by the UE, a data session with a PDN via the first data radio link, wherein the data session is associated with a network address, establishing a second data radio link with a target AN based at in least in part on information about the data session, and communicating packets that comprise the network address via the second data radio link using the data session established with the PDN.

An apparatus for wireless communication is described. The apparatus may include means for establishing, by a UE, a first data radio link with a source AN, means for establishing, by the UE, a data session with a PDN via the first data radio link, wherein the data session is associated with a network address, means for establishing a second data radio link with a target AN based at in least in part on information about the data session, and means for communicating packets that comprise the network address via the second data radio link using the data session established with the PDN.

Another apparatus is described. The apparatus may include a processor, memory in electronic communication with the processor, and instructions stored in the memory. The instructions may be operable to cause the processor to establish, by a UE, a first data radio link with a source AN, establish, by the UE, a data session with a PDN via the first data radio link, wherein the data session is associated with a network address, establish a second data radio link with a target AN based at in least in part on information about the data session, and communicate packets that comprise the network address via the second data radio link using the data session established with the PDN.

A non-transitory computer readable medium for wireless communication is described. The non-transitory computer-readable medium may include instructions to cause a processor to establish, by a UE, a first data radio link with a source AN, establish, by the UE, a data session with a PDN via the first data radio link, where the data session is associated with a network address, establish a second data radio link with a target AN based at in least in part on information about the data session, and communicate packets that comprise the network address via the second data radio link using the data session established with the PDN.

In some examples of the method, apparatus, or non-transitory computer-readable medium described above, the establishing of the second data radio link with the target AN further comprises: transmitting a state of the first data radio link to the target AN. In some examples of the method, apparatus, or non-transitory computer-readable medium described above, the establishing of the second data radio link with the target AN further comprises: synchronizing with the target AN.

In some examples of the method, apparatus, or non-transitory computer-readable medium described above, the PDN is an IP network and the network address is an IP address. In some examples of the method, apparatus, or non-transitory computer-readable medium described above, the PDN is a LAN and the network address is a physical address.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Example wireless communications systems may provide for a user equipment (UE) to establish a packet data network (PDN)-connectivity session with a PDN using a cellular radio access technology (RAT). The example wireless communications systems may make a handover decision and migrate the PDN-connectivity session from a source AN to a target AN. The example wireless communications systems may maintain the same PDN-connectivity session by establishing a data radio link with the target AN and updating a data path to route packets between the UE and PDN via the target AN (instead of via the source AN).

Aspects of the disclosure are initially described in the context of a wireless communication system. Example wireless communications systems may provide a platform that enables a UE to migrate a PDN-connectivity session from a source AN to a target AN without tearing down, and having to reestablish, the PDN-connectivity session. Aspects of the disclosure are further illustrated by and described with reference to apparatus diagrams, system diagrams, and flowcharts that relate to migration of a local gateway function.

Figure 1:
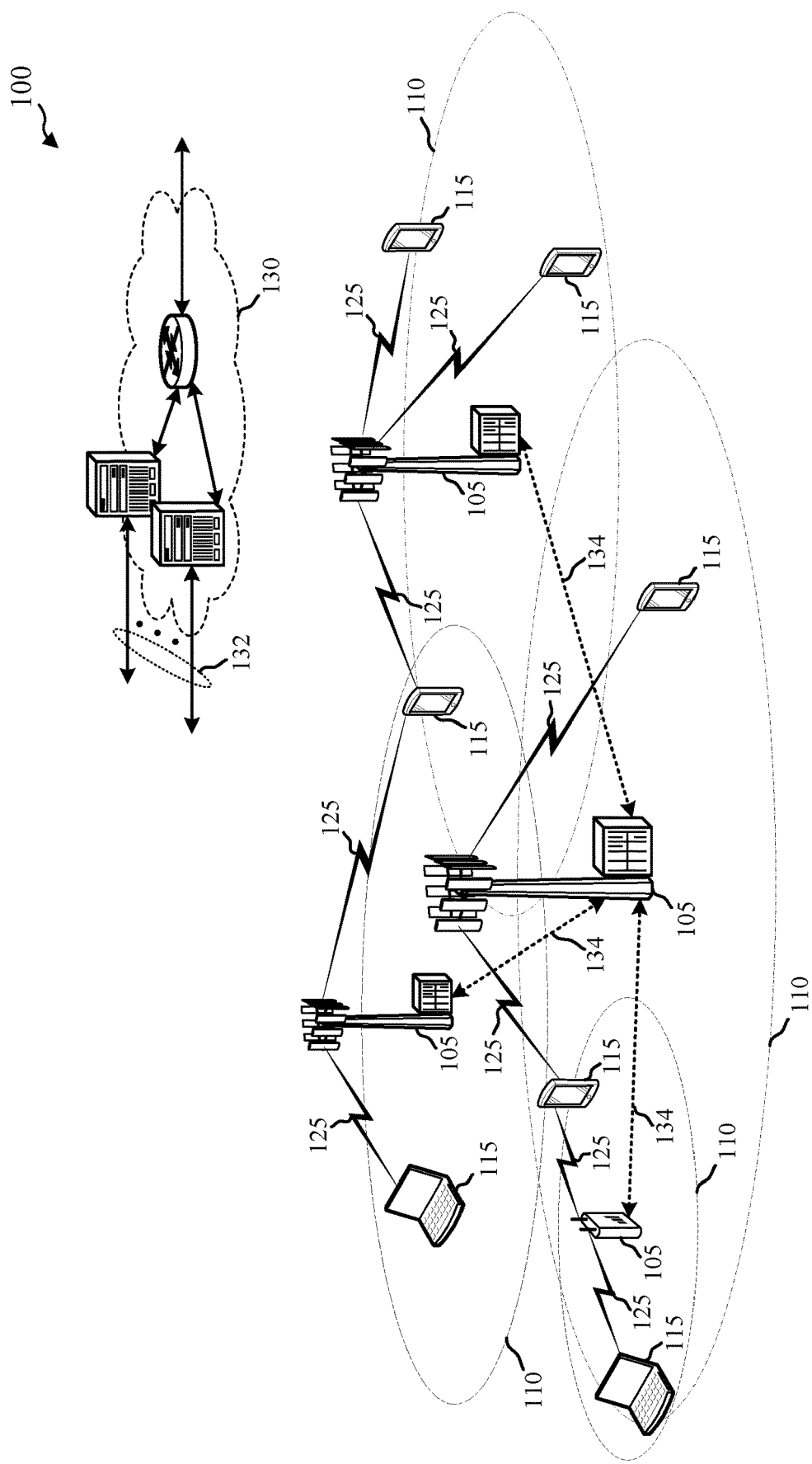
FIG. 1 illustrates an example of a wireless communications system that supports migration of a local gateway function in accordance with aspects of the present disclosure.

FIG. 1 illustrates an example of a wireless communications system 100 that supports migration of a local gateway function in accordance with various aspects of the present disclosure. The wireless communications system 100 includes base stations 105, UEs 115, and a core network (CN) 130. In some examples, the wireless communications system 100 may be a Long Term Evolution (LTE)/LTE-Advanced (LTE-A) network. The wireless communications system 100 may enable a UE 115 to establish a PDN connection with a PDN via a source base station 105 and migrate the PDN connection to a target base station 105 during a handover. Examples of PDNs include a local area network, an internet protocol (IP) network, and the like.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the CN 130 and with one another. For example, base stations 105 may interface with the CN 130 through backhaul links 132 (e.g., S1, etc.). Base stations 105 may communicate with one another over backhaul links 134 (e.g., X2, etc.) either directly or indirectly (e.g., through CN 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the CN 130. The CN may be an evolved packet core (EPC), which may include one or more network nodes. In some examples, the EPC may include at least one mobility management entity (MME), at least one serving gateway (SGW), and at least one PDN gateway (PGW). The MME, SGW, and PGW may be a single network node or may be separate network nodes. The MME may be a control node that processes the signaling between the UE 115 and the EPC. All user internet protocol (IP) packets may be transferred through the SGW, which itself may be connected to the PGW. The PGW may provide IP address allocation as well as other functions. The PGW may be connected to the network operators IP services. The operators IP services may include the Internet, the Intranet, an IP Multimedia Subsystem (IMS), and a Packet-switched Streaming Service (PSS).

An access point name (APN) may be the name of a gateway (GW) between a wireless network and another computer network (e.g., the Internet). A UE 115 making a data connection (as opposed to, e.g., a circuit switched (CS) voice connection) may be configured with an APN, which it conveys upon accessing the network. A server of the CN 130 may then examine the APN to determine what type of network connection should be created (e.g., what IP or IP multimedia subsystem (IMS) address should be assigned or what security methods should be used). In other words, the APN may identify the PDN that a UE 115 wants to communicate with. In addition to identifying a PDN, an APN may also be used to define a service type (e.g., a wireless application protocol (WAP) server or multimedia messaging service (MMS)) that is provided by the PDN.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may include one or multiple symbols. In some cases, the TTI duration (that is, the number of symbols in a TTI) may be variable.

The wireless communications system 100 may provide a platform by which a UE 115 may establish a PDN-connectivity session with a PDN via a source base station 105 and migrate the PDN-connectivity session to a target base station 105 during a handover. The UE 115 and the PDN may maintain the same PDN-connectivity session, but with an update of a data path such that packets are routed via the target base station 105 instead of via source base station 105.

Figures 2A, 2B:
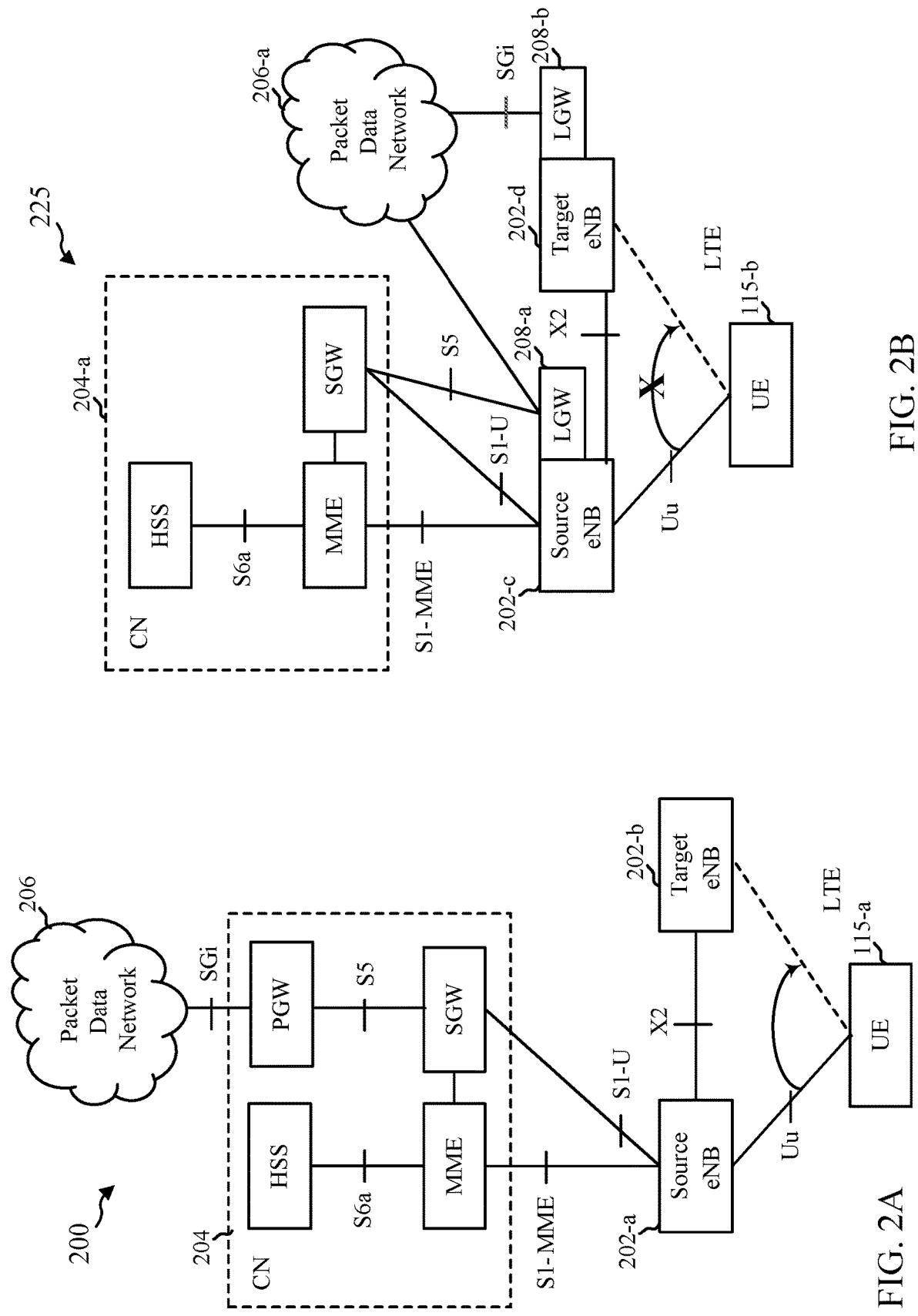
FIGS. 2A through 2B illustrate example wireless communications systems in accordance with aspects of the present disclosure.

FIGS. 2A-2B illustrate examples of wireless communications systems 200, 225, with FIG. 2A depicting a wireless communications system 200 using a PGW of a CN 204 as a central mobility anchor and FIG. 2B depicting a wireless communications system 225 using local gateways (LGWs) 208. Wireless communications systems 200, 225 are examples of a wireless communications system 100 as described with reference to FIG. 1. Wireless communications system 200 may include a UE 115-a communicatively coupled to a source eNB 202-a that provides a PDN-connectivity session with PDN 206 via CN 204. Wireless communications system 225 may include a UE 115-b communicatively coupled to a source eNB 202-c that interacts with CN 204-a to provide PDN-connectivity session with PDN 206-a via LGW 208-a. CN 204, 204-a are examples of CN 130 as described with reference to FIG. 1. Source and target eNBs 202-a to 202-d are examples of a base station 105 as described with reference to FIG. 1. LGW 208-a to 208-b may be part of and/or collocated with an eNB 202.

Wireless communications systems 200, 225 allow UEs 115-a, 115-b to handover between access nodes (ANs) without disrupting ongoing data sessions. An AN may be any type of access node, including an eNB, that may establish a data radio link (DRL) with a UE 115. It is noted that the terms DRL and data radio bearer, as used herein, are interchangeable. Handover may involve transfer of radio-link state from a source eNB 202 to a target eNB 202. In addition, wireless communications systems 200, 225 may update a data path at handover so that downlink data arrives at the target eNB rather than the source eNB. The CN 204 may include one or more network nodes that coordinate handover. In the depicted examples, an SGW and a PGW are network nodes in CN 204 that may perform handover and updating of a data path.

While enabling UE mobility, conventional systems create suboptimal routing paths, especially for local traffic (e.g., where the remote host of the PDN-connectivity session resides at or in close vicinity to the source eNB). Using a conventional solution, for wireless communications systems 200, would create suboptimal routing when handing off the PDN-connectivity session from the source eNB 202-a to target eNB 202-b due to traffic destined for UE 115-a being routed first to source eNB 202-a and then tunneled to target eNB 202-b. Suboptimal routing introduces unnecessary latency, session ramp-up times, and congestion on a backhaul network. Conventional systems have attempted to address this problem by collocating LGWs 208 with eNBs 202 that provide a connection to a local PDN 206. Services, hosted in the local PDN 206, may therefore be accessed directly via the LGW 208 avoiding the large detour via SGW and PGW of CN 204. An LGW 208 may also refer to forwarding elements (FEs) and other type of forwarding nodes that carry forwarding information base (FIB) entries and accomplish forwarding tasks based at least in part on the FIB entries.

LGWs 208, however, limit mobility support. When, in conventional systems, a UE performs a handover between two eNBs that use different LGWs, a PDN-connectivity session is torn down at source eNB 202-a and reestablished at target eNB 202-b. For instance, an existing PDN-connectivity session a UE 115-b established with source eNB 202-c cannot be transferred to target eNB 202-d due to source eNB 202-c using LGW 208-a and target eNB 202-d using LGW 208-b.

The example wireless communications systems provide a solution for migrating LGW function during a handover without having to tear down and reestablish a PDN-connectivity session, and without sacrificing the benefits of shortest-path routing. The example wireless communications systems beneficially combine mobility support with path-optimal routing and may be valuable in light of the evolution of cellular access technologies. Since access-link-related latency is improving over generations of cellular technologies, the delay from suboptimal routing through the CN 204 is increasingly becoming a performance-limiting factor. Further, use cases that are of mission-critical nature, such as tight control operations used in factory automation, may require substantially lower end-to-end latencies. Mission-critical use cases, for example, apply to PDNs of confined dimensions (e.g. such as encountered in enterprises, factories, hospitals, and other primate entity premises) where traffic is of high volume, local in nature, and subject to low-latency requirements. The example wireless communications systems described herein support access to IP-*b* ased PDNs and LAN-*b* ased packet-access systems via cellular RATs. LAN-*b* ased wireless communications systems may leverage 802-*b* ased protocols defined by IEEE. In particular, the Ethernet protocol (802.3) may be used for transport while forwarding occurs via Ethernet bridges as described by 802.1.

Figure 3B:
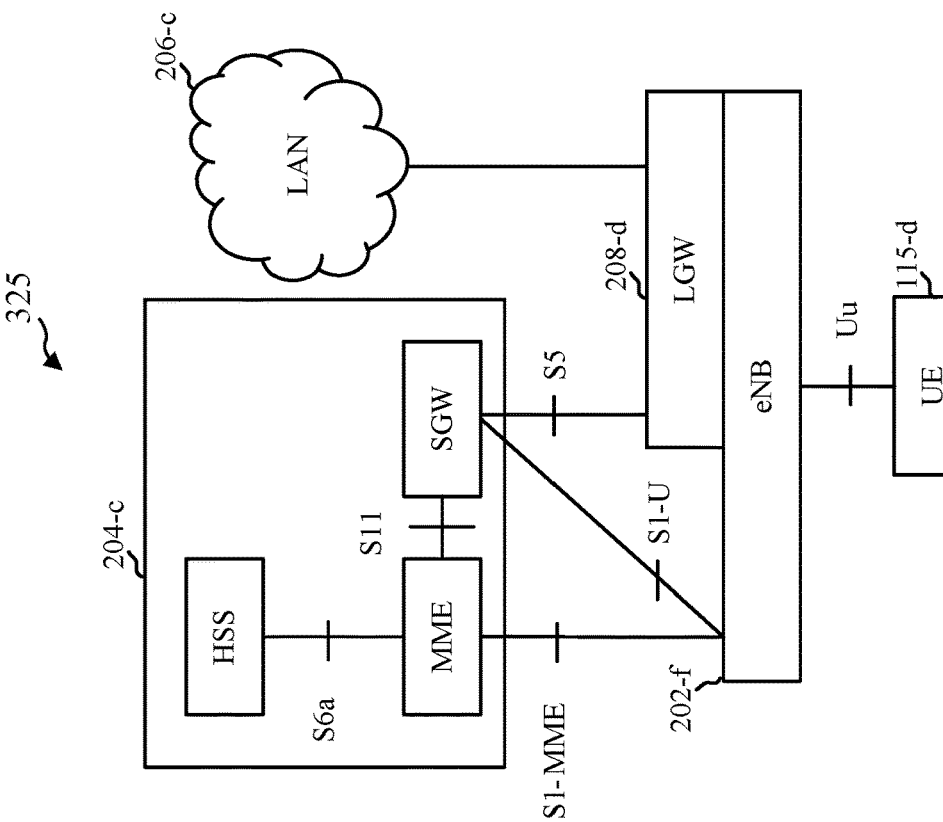
FIGS. 3A through 3B illustrate example architectures of wireless communications systems that supports migration of a local gateway function in accordance with aspects of the present disclosure.
Figure 3A:
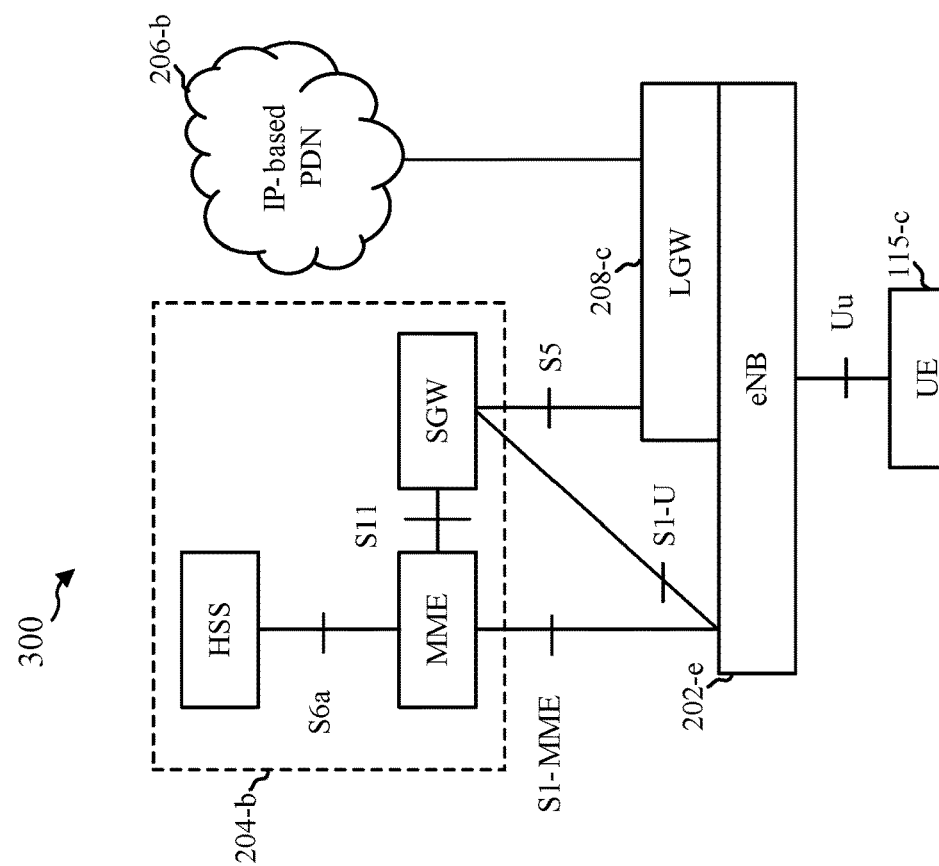

FIGS. 3A-3B illustrate example architectures of wireless communications systems utilizing LGWs, with FIG. 3A depicting a wireless communications system 300 providing a UE 115-c access to an IP-*b* ased PDN 206-*b*, and FIG. 3B depicting a wireless communications system 325 providing a UE 115-*d* access to a LAN PDN 206-*c*. Wireless communications systems 300, 325 are examples of a wireless communications system 100 as described with reference to FIG. 1. Wireless communications system 300 may include a UE 115-*c* communicatively coupled to an eNB 202-*e* that interacts with CN 204-*b* to provide PDN connectivity to IP-*b* ased PDN 206-*b* via LGW 208-*c*. Wireless communications system 325 may include a UE 115-*d* communicatively coupled to an eNB 202-*f* that interacts with CN 204-*c* to provide PDN connectivity to LAN PDN 206-*c* via LGW 208-*d*. CN 204-*b*, 204-*c* are examples of CN 130 as described with reference to FIG. 1. Source and target eNBs 202-*e* and 202-*f* may be examples of a base station 105 as described with reference to FIG. 1. LGW 208-*c* to 208-*d* may be part of and/or collocated with an eNB 202.

Figure 4B:
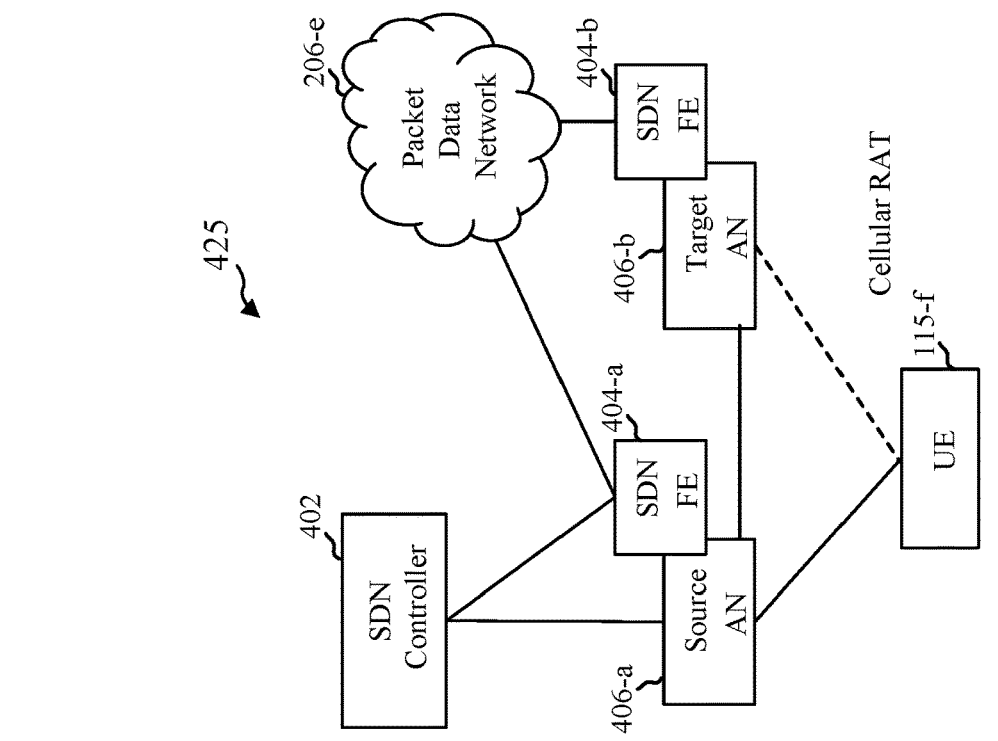
FIGS. 4A through 4C illustrate example wireless communications systems that enable handover between source and target access nodes (ANs) while retaining a packet data network (PDN)-connectivity session in accordance with aspects of the present disclosure.
Figure 4A:
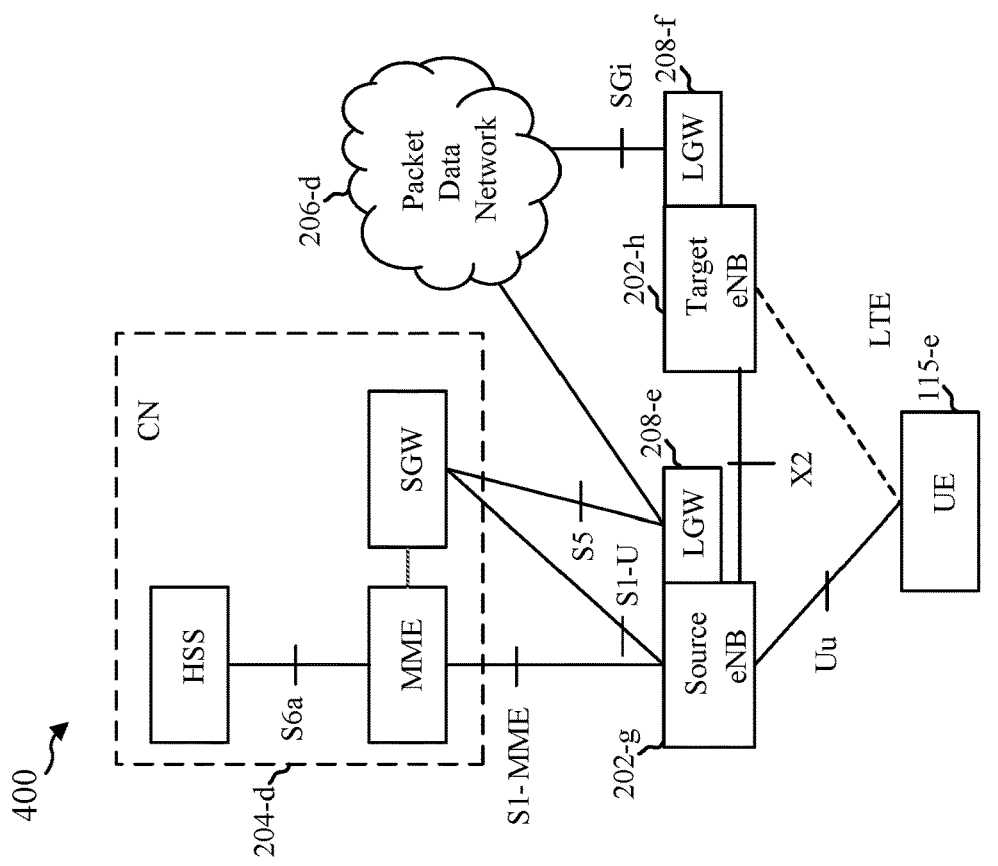
Figure 4C:
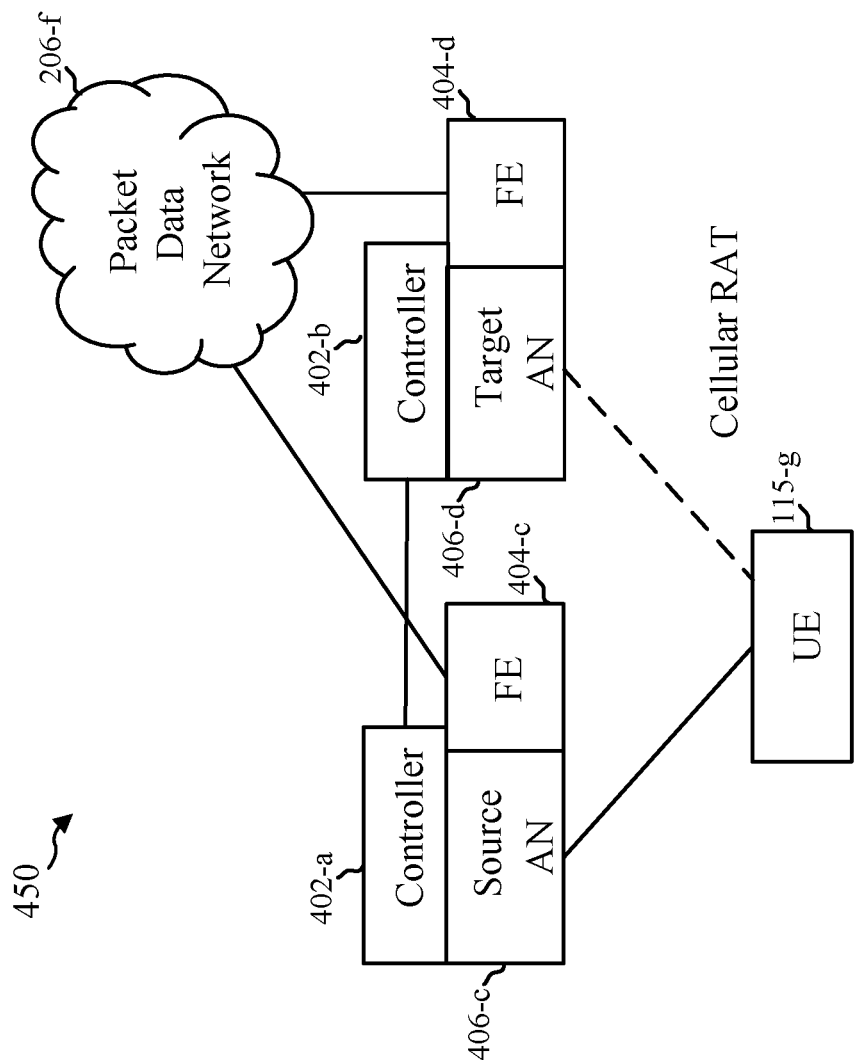

FIGS. 4A-4C illustrate example wireless communications systems that enable handover between source and target ANs while retaining a PDN-connectivity session. FIG. 4A depicts a wireless communications system 400 that performs a handover between source and target eNBs 202 having separate LGWs. FIG. 4B depicts a wireless communications system 425 that performs a handover between source and target ANs 406 using FEs and a centralized network node (e.g., software-defined networking (SDN) controller 402). FIG. 4C depicts a wireless communications system 450 that performs a handover between source and target ANs using SDN forwarding elements (SDN FEs) and distributed network nodes (e.g., SDN controllers 402).

The wireless communications system 400 (see FIG. 4A) may provide UE 115-*e* access to PDN 206-*d* via eNBs 202-*g*, 202-*e* and LGWs 208-*e*, 208-*f*. CN 204-*d* is an example of CN 130 as described with reference to FIG. 1. Source and target eNBs 202-*g*, 202-*h* are examples of a base station 105 as described with reference to FIG. 1. LGW s 208-*e*, 208-*f* may be part of and/or collocated with a base station 105. The LGWs 208-*e*, 208-*f* may interface to the PDN 206-*d*, which may be, for example, an IP-*b* ased or Ethernet-*b* ased PDN. In some examples, eNBs 202-*g*, 202-*h* may be collocated with a SGW of a CN 204-*d*. In other examples, LGWs 208-*e*, 208-*f* may be standalone. The example wireless communications systems may be agnostic to the architecture of the cellular access network. For example, an eNB 202 may represent an AN 406, and vice versa.

The concepts described herein may also be implemented utilizing SDN. In SDN, an SDN controller 402 may be a network node that performs control-plane functions that are, for example, executed in the CN 204, and an SDN FE 404 may perform functionality of an LGW 208. In some examples, the SDN controller 402 may be centralized (see FIG. 4B) or distributed (see FIG. 4C). As seen in FIG. 4C, an AN 406 may be collocated with an SDN FE 404 and a local SDN controller 402. Additionally or alternatively, an LGW 208, and SGW and MME of CN 204-*d*, may be collocated with the eNB 202-*e*.

In an example, wireless communications system 425 (see FIG. 4B) may provide UE 115-*f* access to PDN 206-*e* via a cellular RAT. UE 115-*f* may communicate with source AN 406-*a* and target AN 406-*b*. Source AN 406-*a* and target AN 406-*b* may include respective SDN FEs 404-*a*, 404-*b* that interface with the PDN 206-*e*, which may be, for example, an IP-*b* ased or Ethernet-*b* ased PDN. Source AN 406-*a* and target AN 406-*b* may be examples of a base station 105 as described with reference to FIG. 1. SDN FEs 404-*a*, 404-*b* may be part of and/or collocated with source and target ANs 406-*a*, 406-*b*, respectively.

In an example, wireless communications system 450 (see FIG. 4C) may provide UE 115-*g* access to PDN 206-*f* via a cellular RAT. UE 115-*g* may communicate with source and target ANs 406-*c*, 406-*d*. Source and target ANs 406-*c*, 406-*d* may include respective SDN FEs 404-*c*, 404-*d* that interface with the PDN 206-*f*, which may be, for example, an IP-*b* ased or Ethernet-*b* ased PDN. Source and target 406-*c*, 406-*d* may be examples of a base station 105 as described with reference to FIG. 1. SDN FEs 404-*c*, 404-*d* may be part of and/or collocated with source and target ANs 406-*c*, 406-*d*, respectively.

Figure 5A:
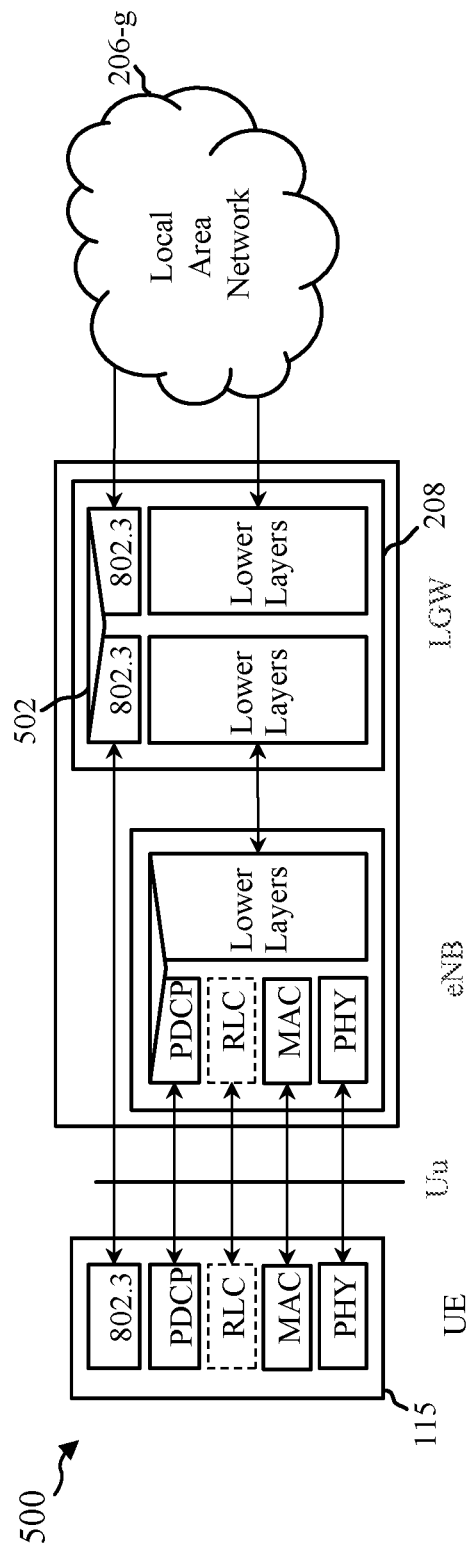
FIGS. 5A through 5B illustrate example user-plane protocol stacks that support migration of a local gateway function in accordance with aspects of the present disclosure.
Figure 5B:
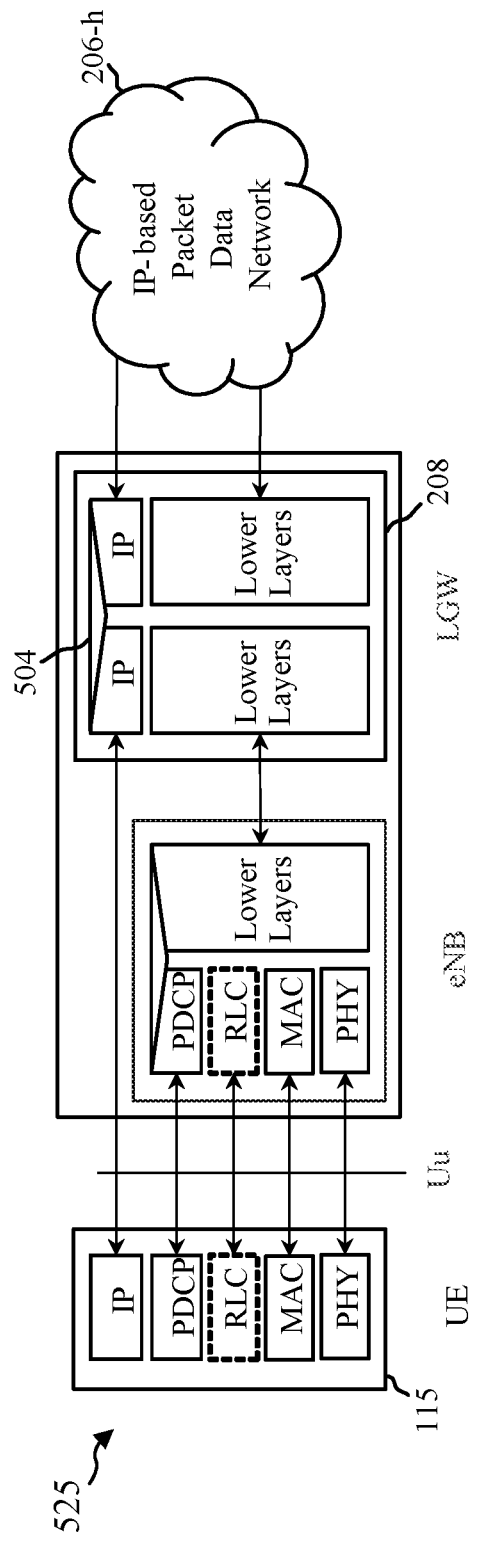

FIGS. 5A-5B illustrate example user-plane (U-plane) protocol stacks that support migration of a local gateway function, with FIG. 5A depicting a U-plane protocol stack 500 for establishing a LAN-*b* ased PDN-connectivity session (e.g., an Ethernet-*b* ased PDN) and FIG. 5B depicting a U-plane protocol stack 525 for establishing an IP-*b* ased PDN-connectivity session. As seen in FIG. 5A, U-plane protocol stack 500 supports a data link layer 502 (e.g., Ethernet layer) on top of a cellular RAT. Via the U-plane protocol stack 500, a UE 115 may exchange data link layer packets (e.g., Ethernet packets) with LGW 208 on top of a wireless data link. LGW 208 may interface to a LAN PDN 206-*g* via an 802.1 bridging function. The example wireless communications systems may thus leverage LAN-*b* ased U-plane concepts to provide a UE 115 access to LAN-*b* ased services via a cellular RAT.

As seen in FIG. 5B, U-plane protocol stack 525 supports an IP layer 504 on top of a cellular RAT. Via the U-plane protocol stack 525, a UE 115 may exchange IP packets with LGW 208 on top of a wireless data link. LGW 208 may interface to an IP-*b* ased PDN 206-*h*. The example wireless communications systems may thus leverage IP-*b* ased U-plane concepts to provide a UE 115 access to IP-*b* ased services via a cellular RAT. Protocol stacks different than depicted in FIGS. 5A-5B may be used as long as similar information is provided to control-plane (C-plane) nodes.

FIGS. 6-9 depict example signaling flow for a wireless communications system supporting inter-AN handover that retains a PDN-connectivity session and path optimality.

Figure 6:
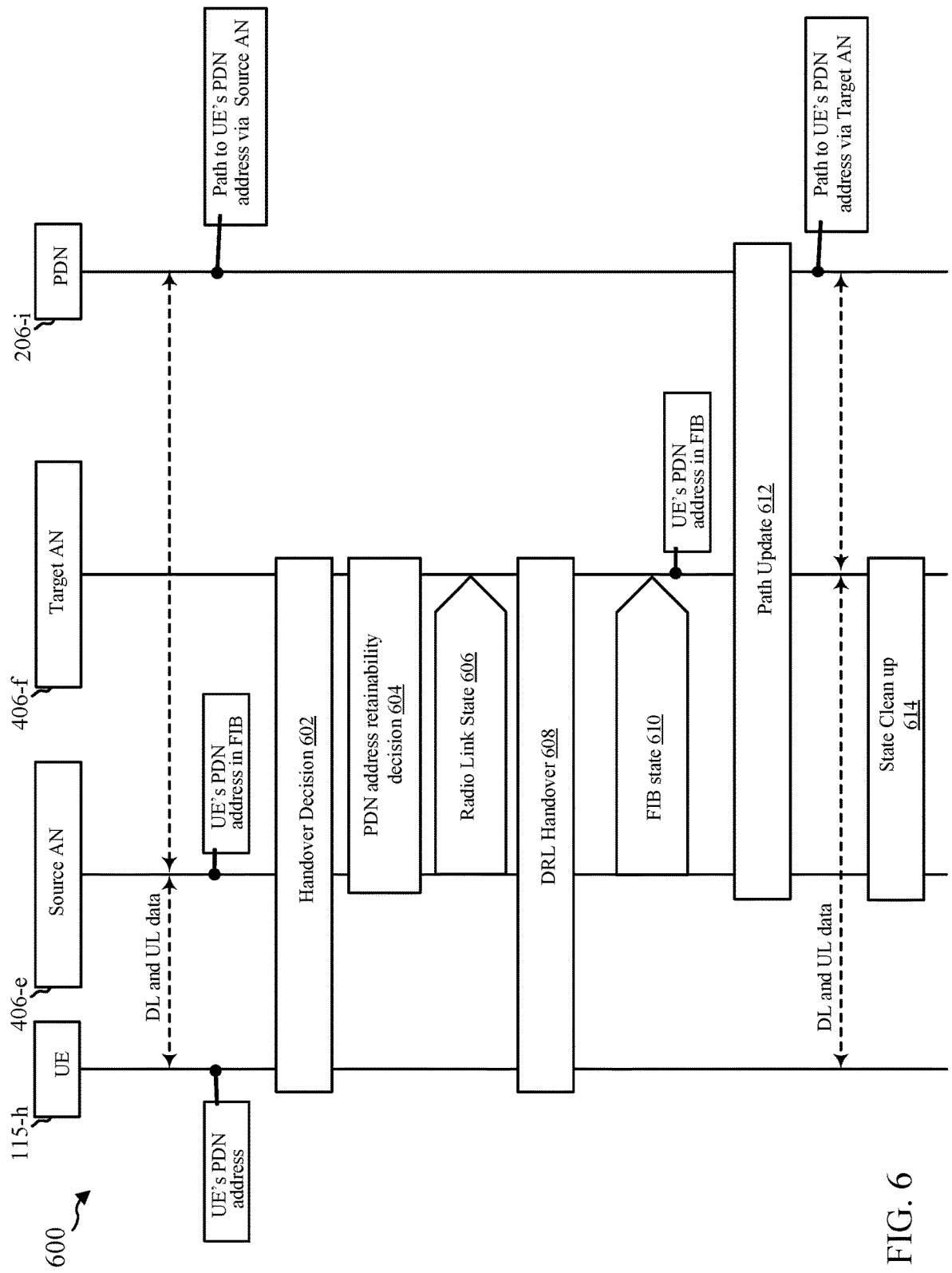
FIGS. 6 through 9 illustrate example signaling flows that support migration of a local gateway function in accordance with aspects of the present disclosure.

FIG. 6 illustrates an example signaling flow 600 used by a wireless communications system for migrating a PDN-connectivity session in accordance with example embodiments. In this example, source AN 406-*e* and target AN 406-*f* may each perform AN and LGW functionality. Source AN 406-*e* and target AN 406-*f* may consult one or more network nodes, such as, for example, CN 204 or SDN controller 402 (e.g., in wireless communications systems 400, 425 shown in FIG. 4A or 4B) or may locally control operations (e.g., such as in wireless communications system 450 shown in FIG. 4C).

In FIG. 6, a UE 115-*h* has already established a PDN-connectivity session with PDN 206-*i* via source AN 406-*e*. As part of the PDN-connectivity session, the UE 115-*h* may have established a DRL with source AN 406-*e*. UL and DL data may be exchanged between UE 115-*h* and PDN 206-*i* via source AN 406-*e* and source LGW via the established DRL. The UE 115-*h* may hold a network address (e.g., a PDN address) and the LGW of source AN 406-*e* may hold an FIB entry for the PDN address. For IP-*b* ased PDNs, the PDN address may be an IP address (e.g., IPv4 address, IPv6 address, and the like). For Ethernet-*b* ased PDNs, the PDN address may be a physical address (e.g., a MAC/extended unique identifier (EUI) address). The PDN 206-*i* further may have established a data path to forward packets with the PDN address of the UE 115-*h* as a destination address to an LGW of the source AN 406-*e*.

Signaling flow 600 may include the following signaling for migrating a PDN-connectivity session from source AN 406-*e* to target AN 406-*f* The signaling may be performed in other orders, some signaling may be combined, and a message described as being sent in a particular signal may be sent in multiple signals at the same or other times.

At some time, a handover decision 602 may be made to handover UE 115-*h* from source AN 406-*e* to target AN 406-*f*. The handover decision 602 may be based at least in part on, for example, a measurement of signal strength of a signal communicated between UE 115-*h* and each of source AN 406-*e* and target AN 406-*f*. The handover decision 602 may involve UE 115-*h*, source AN 406-*e*, and target AN 406-*f*, and may be based at least in part on the RAT technology being used. Any of the UE 115-*h*, source AN 406-*e*, and target AN 406-*f*, individually or any combination, may make the handover decision 602. Another network device responsible for making such determinations may also make handover decision 602. In one or more of the handover decision 602, and in messages 604, 606, 608, 610, and 612 described below, Target AN 406-*f* may receive information about the PDN-connectivity session the UE 115-*h* established with PDN 206-*i*. Target AN 406-*f* may use the information in one or more of messages 602, 604, 606, 608, 610, and 612, to determine to migrate the PDN-connectivity session to target AN 406-*f*.

Source AN 406-*e* and target AN 406-*f* may be configured with a network identifier for indicating on what PDN 206 each of the source AN 406-*e* and target AN 406-*f* can communicate. In an example, the network identifier may be a PDN identifier (PDN-ID). A PDN address retainability decision 604 may be made determining whether a PDN address of the UE 115-*h* is reachable on the PDN 206-*i* after migration from the source AN 406-*e* to the target AN 406-*f*. The PDN-ID may be an identifier of a forwarding or routing domain of a PDN 206. If the PDN-IDs match, that means that each of the source AN 406-*e* and target AN 406-*f* may communicate with the same PDN 206 and hence the PDN address is reachable on that PDN 206. Any of the UE 115-*h*, source AN 406-*e*, target AN 406-*f*, another network device, individually or any combination, may make the retainability decision 604.

If not on the same PDN 206, the respective LGWs of source AN 406-*e* and target AN 406-*f* are configured with different PDN-IDs and migration from source AN 406-*e* to target AN 406-*f* may be rejected, causing signaling flow 600 to end. In such a situation, the PDN-connectivity session via source AN 406-*e* may be to be torn down and a new PDN session may be established via target AN 406-*f*. If the respective LGWs reside on the same PDN 206-*i* (e.g., LAN, IP subdomain or Proxy Mobile IP (PMIP) Local Mobility Anchor (LMA)), source AN 406-*e* and target AN 406-*f* may be configured with the same PDN-ID and thus may be configured to communicate with the same PDN 206-*i*. Thus, the PDN-connectivity session may be migrated from source AN 406-*e* to target AN 406-*f*, and signaling flow 600 may continue as described below.

The source AN 406-*e* may transmit information about the PDN-connectivity session, including information about the first data radio link, to the target AN 406-*f* In an example, the target AN 406-*f* may receive a radio link state 606 from the source AN 406-*e*. To accomplish this transfer, a handover procedure may be used to transfer the radio-link state 606 including, for example, an X2-handover, an S1-handover, or other handover procedure. In some examples, the radio-link state 606 may include a security credential, or the source AN 406-*e* or UE 115-*h* may communicate a security credential associated with a DRL to the target AN 406-*f* via a signaling radio link. The target AN 406-*f* may use the first data radio link information for establishing a DRL with the UE 115-*h*.

The UE 115-*h* may perform a DRL handover 608 from source AN 406-*e* to target AN 406-*f* using a handover procedure of the RAT. For packets received during the handover procedure, the source AN 406-*e* may establish a tunnel with target AN 406-*f* using a tunnel-point address and forward the received packets to the target AN 406-*f* via the tunnel for forwarding to the UE 115-*h*.

The source AN 406-*e* may migrate an FIB state 610 to the target AN 406-*f*. The FIB state 610 may include a PDN address of the UE 115-*h* and identify a mapping of the PDN address to a DRL. In an example, the source AN 406-*e* may transmit the FIB state 610 to the target AN 406-*f*. In another example, the FIB state 610 may be held centrally (e.g., at CN 204 and/or a SDN controller 402), and the FIB state 610 may be pushed to the target AN 406-*f* or the target AN 406-*f* may pull the FIB state 610. In other examples, target AN 406-*f* may receive the PDN address of UE 115-*h* via CN 204 or from UE 115-*h* via a signaling radio link. For example, UE 115-*h* may transmit to a network node (e.g., CN 204) a request to migrate the PDN-connectivity session that includes a request for the FIB state 610. In an example, the request to migrate may be a request to establish a second data session by migrating the PDN-connectivity session from the first path via source AN 406-*e* to the updated path via target AN 406-*f*.

Target AN 406-*f* may utilize the FIB state 610 for creating a mapping for a forwarding function. For example, the mapping may indicate that packets received from PDN 206-*i* and having the PDN address of UE 115-*h* are to be forwarded to the DRL established between the UE 115-*h* and target AN 406-*f*.

The source AN 406-*e* may send a path update 612 for informing the PDN 206-*i* of an updated path for routing traffic destined for UE 115-*h* (e.g., via target AN 406-*f* instead of source AN 406-*e*). Path update 612 may instruct PDN 206-*i* to change the path for UE-destined packets from the source AN 406-*e* to the target 406-*f* In an example, the PDN 206-*i* may update one or more routing or forwarding tables based at least in part on the path update 612 to provide for continuity of a PDN-connectivity session for the UE 115-*h*. In an example, path update 612 may be a U-plane packet or a signaling message.

The path update 612 may include the network address (e.g., the PDN address) of UE 115-*h*, an indication of the updated path for the PDN-connectivity session via target AN 406-*f*, and an identifier of a second data radio link established between the UE 115-*h* and target AN 406-*f*. In an example, the path update 612 may be a request transmitted to the PDN, which may include a network node, to migrate the PDN-connectivity session to the target AN 406-*f*. Updating the path may be considered establishing a second data session by migrating the PDN-connectivity session from the first path via source AN 406-*e* to the updated path via target AN 406-*f*.

In an example, one or more distributed protocols may be used to update the path (e.g., Rapid Spanning Tree Protocol (RSTP) and Shortest-Path Bridging (SPB) for LANs, Open Shortest Path First (OSPF), Border Gateway Protocol (BGP), Optimized Link State Routing (OLSR) for IP-based PDNs, Address Resolution Protocol (ARP) and Network Discovery Protocol (NDP) for LANs with IP on top, and the like). A centralized path-updating mechanism may also be used (e.g., PMIP, Locator/Identifier Separation Protocol (LISP), and the like). In an example, the path update 612 may be a multicast message, a broadcast message, a routing message, a LAN signaling message, any combination thereof, and the like. Target AN 406-*f* may also communicate the PDN path update 612 to at least one next-hop peer AN.

After updating the data path, the PDN-connectivity session may have been migrated from source AN 406-*e* to target AN 406-*f*, and the UE 115-*h* and PDN 206-*i* may exchange packets via the same PDN-connectivity session but using the updated data path. The packets associated with the PDN-connectivity session may include the network address of UE 115-*h* and may traverse the DRL established with the target AN 406-*f*. The target AN 406-*f* may thus forward packets between the UE 115-*h* and PDN 206-*i* via the DRL established between the target AN 406-*f* and UE 115-*h*. The source AN 406-*e* and target AN 406-*f*, and an associated LGW of each, may signal one another to perform a state clean up 614 of a remaining state of the initial data path.

Figure 7:
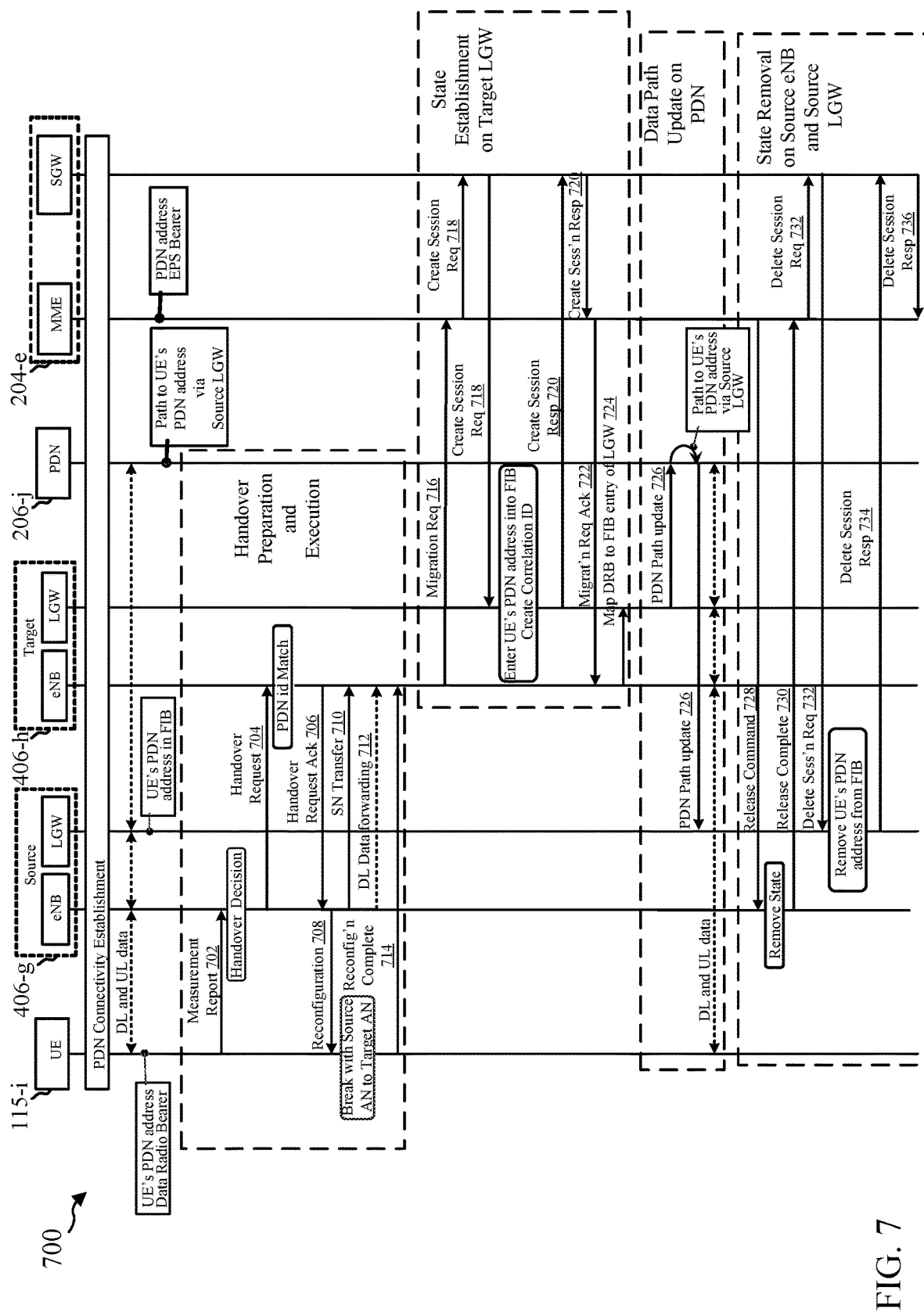

FIG. 7 illustrates an example signaling flow 700 for migrating a PDN-connectivity system using wireless communications system 400 described with reference to FIG. 4A. In FIG. 7, a UE 115-*i* has already established a PDN-connectivity session with PDN 206-*j*. As part of the PDN-connectivity session, UE 115-*i* previously established a data radio bearer (DRB) with source AN 406-*g* and an LGW associated with source AN 406-*g*. The UE 115-*i* thus holds a PDN-address and sustains a DRB with the eNB of source AN 406-*g*. The LGW of source AN 406-*g* further holds an FIB entry for a PDN address of the UE 115-*i*. A network node (e.g., MME) of CN 204-*e* may also store the PDN address of the UE 115-*i*, an identifier of the DRB, and an identifier of an evolved packet system (EPS) bearer established for packet transport via the PDN-connectivity session. Further, the PDN 206-*j* may have a forward/routing path established for the PDN address of the UE 115-*i*.

Signaling flow 700 may include the following signaling for migrating a PDN-connectivity session from source AN 406-*g* to target AN 406-*h*. The signaling may be performed in other orders, some signaling may be combined, and a message described as being sent in a particular signal may be sent in multiple signals at the same or other times.

At some time, a UE 115-*i* may send a measurement report 702 to eNB of source AN 406-*g*. The measurement report may include a measurement of signal strength of a signal communicated between UE 115-*i* and each of source AN 406-*g* and target AN 406-*h*. Based at least in part on the measurement report 702, eNB of source AN 406-*g* may make a handover decision.

If the decision is to perform a handover, eNB of source AN 406-*g* may send a handover request 704 to eNB of target AN 406-*h*. In one or more of the handover request 704, and in messages 706, 710, 712, 718, 722, 724, and 726 described below, target AN 406-*h* may receive information about the PDN-connectivity session the UE 115-*i* established with PDN 206-*j*. In some examples, target AN 406-*h* may use the information in one or more of messages 704, 706, 710, 712, 718, 722, 724, and 726 to determine to migrate the PDN-connectivity session to target AN 406-*h* by establishing a second data session via target AN 406-*h* (instead of via source AN 406-*g*).

In an example, handover request 704 may include the PDN-ID of source AN 406-*g*. eNB of target AN 406-*h* may compare the received PDN-ID to a PDN-ID the eNB has cached for its own LGW. If the PDN-IDs do not match, the migration of the PDN-connectivity session may not be accomplished. Instead, the PDN-connectivity session may be torn down with source AN 406-*g* and a new PDN-connectivity session may be established via target AN 406-*h*.

If, however, both PDN-IDs match, handover and PDN-connectivity migration may proceed, and eNB of target AN 406-*h* may send a handover request acknowledgement (ACK) indicating that migration and handover may proceed. The handover request ACK 706 may include a state for radio bearer establishment and one or more tunnel endpoint identifiers. The one or more tunnel endpoint identifiers may be used to establish a tunnel between source AN 406-*g* and target AN 406-*h* for forwarding of DL packets from source AN 406-*g* to target AN 406-*h* during execution of the handover. In an example, the handover request 704 may include a security credential, or the source AN 406-*g* or UE 115-*i* may communicate a security credential associated with the DRB via a signaling radio link.

eNB of source AN 406-*g* may transmit a reconfiguration request 708 (e.g., a radio resource control (RRC) connection reconfiguration request) to UE 115-*i* to initiate handover from source AN 406-*g* to target 406-*h*. The reconfiguration request 708 may contain the state for radio bearer establishment received from eNB of target AN 406-*h*. The UE 115-*i* may then break synchronization with the eNB of source AN 406-*g*. The UE 115-*i* may use the state for radio bearer establishment to synchronize and establish one or more DRBs with eNB of target AN 406-*h*. UE 115-*i* may confirm handover by sending a reconfiguration complete 714 (e.g., an RRC connection reconfiguration complete message) to the eNB of target AN 406-*h*.

After synchronization has been broken, eNB of source AN 406-*g* may stop DL transfer of packets to UE 115-*i* arriving via the LGW of source AN 406-*g* via the DRB between UE 115-*i* and source AN 406-*g*. Instead, source AN 406-*g* may establish one or more one or more tunnels to the target AN 406-*h* using the one or more tunnel endpoint identifiers and forward DL packets 712 arriving for the UE 115-*i* to the target AN 406-*h* via the one or more tunnels. Source AN 406-*g* may also forward a present packet sequence number (SN) 710 to eNB of target AN 406-*h* via the one or more tunnels.

eNB of target AN 406-*h* may initiate an LGW migration process by sending a migration request 716 (e.g., an LGW migration request message) including a network address of target LGW to a network node (e.g., MME) of CN 204-*e*. The migration request 716 may be a request to establish, at the target AN 406-*h*, a second data session corresponding to the first data session for maintaining the PDN-connectivity session. After receipt, MME of CN 204-*e* may generate a create session request 718 that includes the PDN address of UE 115-*i* and the network address of target LGW. MME of CN 204-*e* may send the create session request 718 to a second network node (e.g., SGW) of CN 204-*e*. In some examples, MME and SGW may be separate network nodes, and in other examples, MME and SGW may be a single network node. SGW of CN 204-*e* may forward the create session request 718 to the LGW of target AN 406-*h*. The LGW of target AN 406-*h* may implement a new FIB for the PDN address of UE 115-*i* and create a correlation identifier (ID). In other examples, LGW of target AN 406-*h* may receive the PDN address of UE 115-*i* via CN 204-*e* or from UE 115-*i* via a signaling radio link.

LGW of target AN 406-*h* may send to SGW of CN 204-*e* a create session response 720 that includes the correlation ID. SGW of CN 204-*e* may forward the create session response 720 to the MME of CN 204-*e*. MME may send to eNB of target AN 406-*h* an LGW migration request ACK 722 that includes the correlation ID. eNB of target AN 406-*h* may use the correlation ID to internally interconnect the LGW's FIB entry to one or more data radio bearers the UE115-*i* established with target AN 406-*h*. For example, eNB of target AN 406-*h* may map 724 a DRB to an FIB entry of the LGW. In an example, the target AN 406-*h* may use the FIB entry to create a mapping for a forwarding function. For example, the mapping may indicate that packets received from PDN 206-*j* and having the PDN address of UE 115-*i* are to be forwarded to the DRB established between the UE 115-*i* and target AN 406-*h*.

LGW of target AN 406-*h* may send a PDN path update 726 to initiate a path update on the PDN 206-*j* for the PDN address of UE 115-*i*. Updating the path may be considered establishing a second data session by migrating the PDN-connectivity session from the first path to source AN 406-*g* to the updated path via target AN 406-*h*. PDN path update 726 may instruct PDN 206-*j* to change the path for UE-destined packets from LGW of source AN 406-*g* to the LGW to target 406-*h*. In an example, the PDN 206-*j* may update one or more routing or forwarding tables based at least in part on the PDN path update 726 to provide for continuity of a PDN-connectivity session for the UE 115-*i*. In an example, PDN path update 726 may be a U-plane packet or a signaling message. After receipt, PDN 206-*j* may update its path and forward the PDN path update 726 LGW of source AN 406-*g*. In an example, updating the path may be accomplished via distributed forwarding or routing protocols. Updating the path may be used to confirm DL reachability of the PDN address of UE 115-*i* on the PDN 206-*j*. In an example, the PDN path update 726 may be a multicast message, a broadcast message, a routing message, a LAN signaling message, any combination thereof, and the like. Target AN 406-*h* may also communicate the PDN path update 726 to at least one next-hop peer AN. After updating the path, the UE 115-*i* may have established PDN connectivity to PDN 206-*j* via eNB and LGW of target AN 406-*h*.

Subsequent to the path being updated, MME of CN 204-*e* may send a release command 728 (e.g., UE Context Release Command) to eNB of source AN 406-*g*. Subsequent to receipt, eNB of source AN 406-*g* may remove the state of the DRB previously established with UE 115-*i*. After removing the DRB state, eNB of source AN 406-*g* may reply to the MME with a release complete 730 (e.g., a UE context release complete message).

MME of CN 204-*e* may send a delete session request 732 via the SGW of CN 204-*e* to LGW of source AN 406-*g*. Subsequent to receipt, LGW of source AN 406-*g* may remove the FIB state for the UE 115-*i*. After removing the DIB state, LGW of source AN 406-*g* may reply to MME with a delete session response 734 via the SGW. Signaling flow 700 may then end.

After completion of signaling flow 700, UE 115-*i* may have migrated a data path of its PDN-connectivity session from source AN 406-*g* to target AN 406-*h*. Thus, the PDN-connectivity was maintained, and, after data-path migration, packets of the PDN-connectivity session exchanged between UE 115-*i* and PDN 206-*j* may be routed via target AN 406-*h* instead of via source AN 406-*g*.

Figure 8:
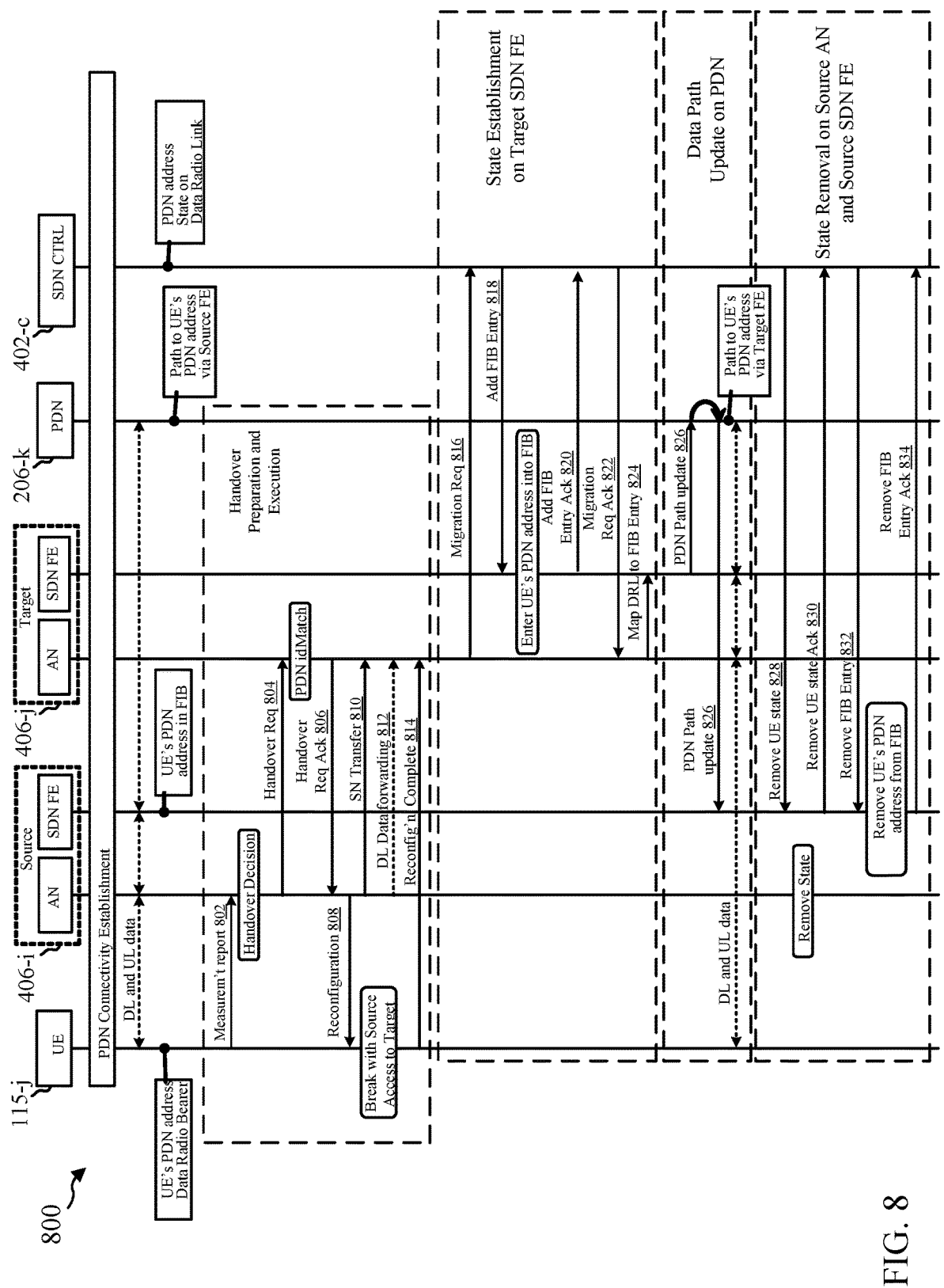

FIG. 8 illustrates an example signaling flow 800 for PDN-connectivity session migration for wireless communications system 425 described with reference to FIG. 4B. In this example, the UE 115-*j* previously established a PDN-connectivity session with PDN 206-*k* via source AN 406-*i* and a source SDN FE associated with source AN 406-*i*. The UE 115-*j* thus holds a PDN-address and sustains a DRL with source AN 406-*i*. An SDN FE of source AN 406-*i* may include an FIB entry with the PDN address of the UE 115-*j*. A network node (e.g., SDN controller 402-*c*) may also store the PDN address of UE 115-*j* and an identifier of the DRL. Further, the PDN 206-*k* may have established a forwarding/routing path for the PDN address of the UE 115-*j*.

Signaling flow 800 may include the following signaling for migrating a PDN-connectivity session from source AN 406-*i* to target AN 406-*j* The signaling may be performed in other orders, some signaling may be combined, and a message described as being sent in a particular signal may be sent in multiple signals at the same or other times.

At some time, a UE 115-*j* may send a measurement report 802 to source AN 406-*i*. The measurement report 802 may include a measurement of signal strength of a signal communicated between UE 115-*j* and each of source AN 406-*i* and target AN 406-*j*. Based at least in part on the measurement report 802, source AN 406-*i* may make a handover decision.

If the decision is to make a handover, source AN 406-*i* may send a handover request 804 to target AN 406-*j*. In one or more of the handover request 804, and in messages 806, 810, 812, 818, 820, 822, 824, and 826 described below, target AN 406-*j* may receive information about the PDN-connectivity session the UE 115-*j* established with PDN 206-*k*. In some examples, target AN 406-*j* may use the information in one or more of messages 804, 806, 810, 812, 818, 820, 822, 824, and 826, to determine to establish a second data session for migrating the PDN-connectivity session to target AN 406-*j*. In an example, the handover request 804 may include the PDN-ID of source AN 406-*i*. The handover request 704 may also include a security credential, or the source AN 406-*i* or UE 115-*j* may communicate a security credential associated with the DRL via a signaling radio link.

Target AN 406-*j* may compare the received PDN-ID to a PDN-ID AN 406-*j* has cached for SDN FE of target AN 406-*j*. If the PDN-IDs do not match, SDN FE migration may not be accomplished. Instead, the PDN-connectivity session may be torn down with source AN 406-*i* and a new PDN-connectivity session may be established with target AN 406-*j*. If, however, both PDN-IDs match, handover and SDN FE migration can proceed and target AN 406-*i* may send a handover request ACK 806 indicating that handover and SDN FE migration can proceed. In an example, handover request ACK 806 may include a state for radio link establishment and one or more tunnel endpoint identifiers. The one or more tunnel endpoint identifiers may be used to establish a tunnel between source AN 406-*i* and target AN 406-*j* for forwarding of DL packets from source AN 406-*i* to target AN 406-*j* during execution of the handover.

Source AN 406-*i* may transmit a reconfiguration request 808 (e.g., a RRC connection reconfiguration request) to UE 115-*j* to initiate handover from source AN 406-*i* to target 406-*j*. The reconfiguration request 808 may contain the state for radio link establishment received from target AN 406-*j*. UE 115-*j* may then break synchronization with source AN 406-*i*. The UE 115-*j* may use the state for radio link establishment to synchronize and establish one or more DRBs with target AN 406-*j*. UE 115-*j* may confirm handover by sending a reconfiguration complete 814 (e.g., an RRC connection reconfiguration complete message) to target AN 406-*j*.

After synchronization has been broken, source AN 406-*i* may stop DL transfer of packets to UE 115-*j* arriving at SDN FE of source AN 406-*i*. Instead, source AN 406-*i* may establish one or more one or more tunnels to the target AN 406-*j* using the one or more tunnel endpoint identifiers and forward DL messages 812 arriving for the UE 115-*j* via the one or more tunnels. Source AN 406-*i* may also forward a present packet SN 810 to target AN 406-*j* via the one or more tunnels.

Target AN 406-*j* may initiate an SDN FE migration process by sending a migration request 816 (e.g., an SDN FE migration request message) including a network address of target SDN FE to SDN controller 402-*c*. The migration request 816 may be a request to establish, at the target AN 406-*j*, a second data session corresponding to the first data session for maintaining the PDN-connectivity session. After receipt, SDN controller 402-*c* may generate an add FIB entry message 818 that includes the PDN address of UE 115-*j* and the network address of the SDN FE of target AN 406-*j*. SDN controller 402-*c* may also create and include a correlation ID in the add FIB entry message 818. SDN FE of target AN 406-*j* may receive the add FIB entry message 818, implement a new FIB entry that includes the PDN address of UE 115-*j*, and cache the correlation ID. In other examples, SDN FE of target AN 406-*j* may receive the PDN address of UE 115-*j* via a CN 204 or from UE 115-*j* via a signaling radio link.

SDN FE of target AN 406-*j* may return an add FIB entry ACK message 820 to the SDN controller 402-*c*. SDN controller 402-*c* may receive the add FIB entry message 818 and return to target AN 406-*j* an SDN FE migration request ACK 822 that includes the correlation ID.

Target AN 406-*j* may use the correlation ID to internally interconnect DRLs the UE 115-*j* established with the target AN 406-*j* to the FIB entry of the SDN FE of target AN 406-*j*. In an example, the target AN 406-*j* may create a mapping for a forwarding function. For example, the mapping may indicate that packets received from PDN 206-*k* and having the PDN address of UE 115-*j* are to be forwarded to the DRL established between the UE 115-*j* and target AN 406-*j*.

SDN FE of target AN 406-*j* may send a PDN path update 826 to initiate a path update on the PDN 206-*k* for the PDN address of UE 115-*j*. PDN path update 826 may instruct PDN 206-*k* to change the path for UE-destined packets from the SDN FE of source AN 406-*i* to the SDN FE of target 406-*j*. In an example, the PDN 206-*k* may update one or more routing or forwarding tables based at least in part on the PDN path update 826 to provide for continuity of a PDN-connectivity session for the UE 115-*j*. In an example, PDN path update 826 may be a U-plane packet or a signaling message. After receipt, PDN 206-*k* may update its path and forward the PDN path update 826 to SDN FE of source AN 406-*i*. In an example, updating the path may be accomplished via distributed forwarding- or routing protocols. Updating the path may be used to confirm DL reachability of the PDN address of UE 115-*j* on the PDN 206-*k*. In an example, the PDN path update 826 may be a multicast message, a broadcast message, a routing message, a LAN signaling message, any combination thereof, and the like. Target AN 406-*j* may also communicate the PDN path update 826 to at least one next-hop peer AN. After updating the path, the UE 115-*j* may have established PDN connectivity to PDN 206-*k* via target AN 406-*j* and its associated SDN FE.

SDN controller 402-*c* may send a remove UE state message 828 to source AN 406-*i*. Subsequent to receipt, SDN FE of source AN 406-*i* may remove the state related to the data radio link previously established with UE 115-*j*. Source AN 406-*i* may reply to the SDN controller 402-*c* with a remove UE state ACK 830. SDN controller 402-*c* may send a remove FIB entry message 832 to SDN FE of source AN 406-*i*. Subsequent to receipt, SDN FE of source AN 406-*i* may remove the FIB state for UE 115-*j*. SDN FE of source AN 406-*i* may reply to SDN controller 402-*c* with a remove FIB entry ACK message 832, and signaling flow 800 may then end.

Similar to the discussion provided above, after completion of signaling flow 800, UE 115-*j* may have migrated a data path of its PDN-connectivity session from source AN 406-*i* to target AN 406-*j*. Thus, the PDN-connectivity session was maintained, and, after data-path migration, packets exchanged between UE 115-*j* and PDN 206-*k* via the PDN-connectivity session may be routed via target AN 406-*j* instead of via source AN 406-*i*.

Figure 9:
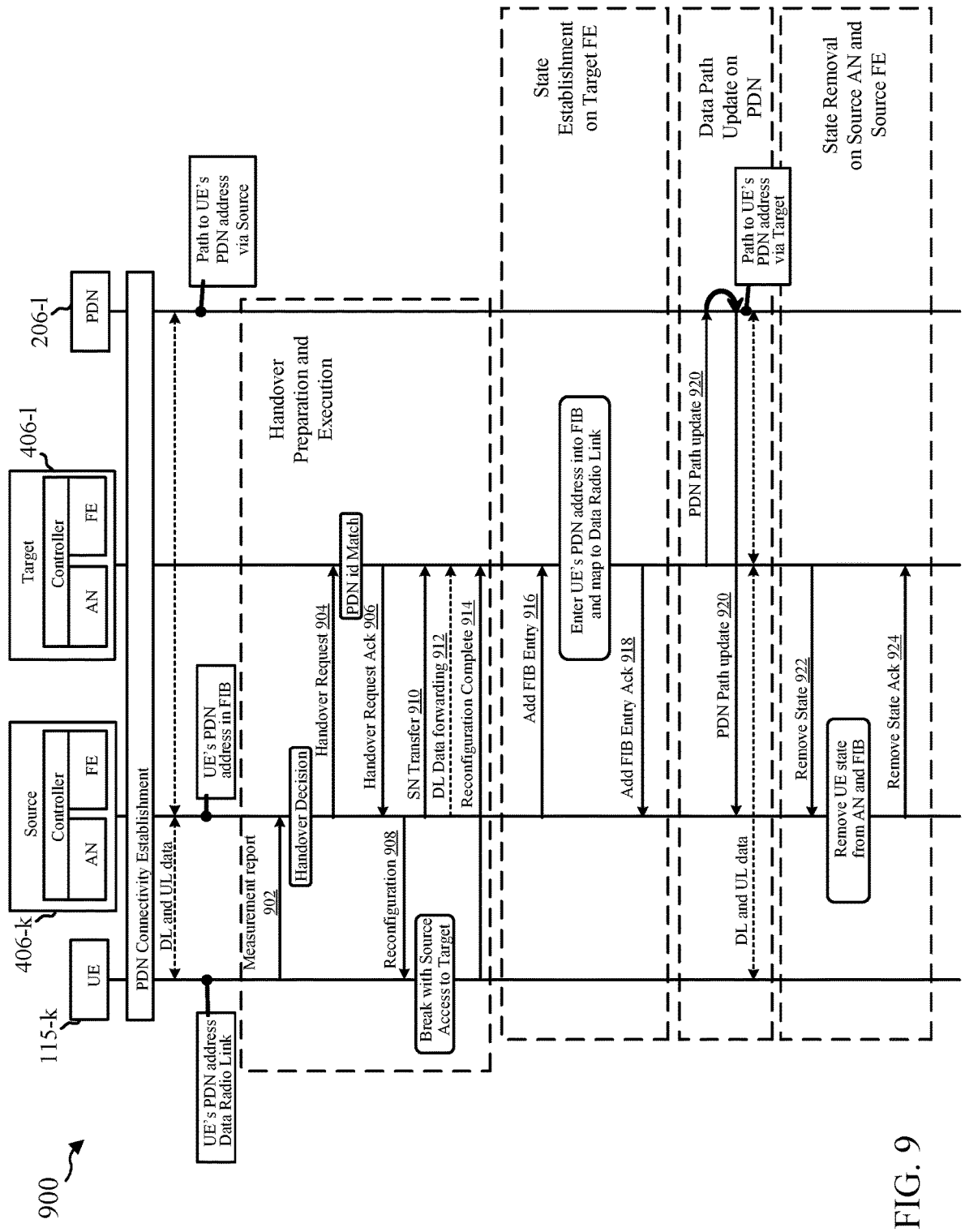

FIG. 9 illustrates an example signaling flow 900 for migrating a PDN-connectivity session for wireless communications system 450 described with reference to FIG. 4C in accordance with example embodiments. In this example, UE 115-*k* has previously established PDN connectivity with PDN 206-*l* via a source AN 406-*k* and a source FE associated with source AN 406-*k*. The UE 115-*k* thus holds a PDN address and sustains a DRL with source AN 406-*k*. FE of source AN 406-*k* further includes an FIB entry with the PDN address of UE 115-*k*. The PDN 206-*l* may have a forwarding/routing path established for the PDN address of UE 115-*k*.

Signaling flow 900 may include the following signaling for migrating a PDN connection from source AN 406-*k* to target AN 406-*l*. The signaling may be performed in other orders, some signaling may be combined, and a message described as being sent in a particular signal may be sent in multiple signals at the same or other times.

Messages 902-914 of signaling flow 900 may be the same as messages 802-814 as described with reference to signaling flow 800. Source AN 406-*k* may generate an add FIB entry message 916 to migrate an FE state to the target AN 406-*l*. The add FIB entry message 916 may include the PDN address of UE 115-*k*. In other examples, target AN 406-*l* may receive the PDN address of UE 115-*k* via a CN 204 or from UE 115-*k* via a signaling radio link.

Target AN 406-*l* may receive the add FIB entry message 916 and add an FIB entry for the PDN address of UE 115-*k*. In this example, target AN 406-*l* includes its own controller operating as a network node, and thus target AN 406-*l* sends a request to target controller to establish a second data session corresponding to the first data session for migrating the PDN-connectivity session to target AN 406-*l*. Further, since target AN 406-*l* contains an FE, the target AN 406-*l* may internally interconnect the FIB entry with the DRL of UE 115-*k*. FIB migration may also be included in messages 904 or 910 of signaling flow 900. Target AN 406-*l* may utilize the PDN address to create a mapping for a forwarding function. The mapping may indicate that packets received from PDN 206-*l* and having the PDN address of UE 115-*k* are to be forwarded to the DRL established between the UE 115-*k* and target AN 406-*l*. Target AN 406-*l* may transmit an FIB entry ACK 918 to source AN 406-*k* to acknowledge transfer of the FE state.

Target AN 406-*l* may send a PDN path update 920 to initiate a path update on the PDN 206-*l* for the PDN address of UE 115-*k*. PDN path update 920 may instruct PDN 206-*l* to change the path for UE-destined packets from the SDN FE of source AN 406-*k* to the SDN FE of target 406-*l*. In an example, the PDN 206-*l* may update one or more routing or forwarding tables based at least in part on the PDN path update 920 to provide for continuity of a PDN-connectivity session for the UE 115-*k*. In an example, PDN path update 920 may be a U-plane packet or a signaling message. After receipt, PDN 206-*l* may update its path and forward the PDN path update 920 to source AN 406-*k*. In an example, updating the path may be accomplished via distributed forwarding or routing protocols. In an example, the PDN path update 920 may be a multicast message, a broadcast message, a routing message, a LAN signaling message, any combination thereof, and the like. Target AN 406-*l* may also communicate the PDN path update 920 to at least one next-hop peer AN. Updating the path may be used to confirm DL reachability of the PDN address of UE 115-*k* on PDN 206-*l*.

After updating the path, the UE 115-*k* may have migrated the data path of the PDN-connectivity session to target AN 406-*l* and SDN FE associated with target AN 406-*l*. The UE 115-*k* and PDN 206-*l* may then exchanges packets of the PDN-connectivity session via target AN 406-*l* (instead of via source AN 406-*k*).

Target AN 406-*l* may send a remove state message 922 to source AN 406-*k* after the PDN-connectivity session has been migrated. Subsequent to receipt, the source AN 406-*k* may remove the FIB and state related to the DRL previously established with UE 115-*k*. Source AN 406-*k* may reply to target AN 406-*l* with a remove state ACK 924 indicating successful removal of the state. Signaling flow 900 may then end.

Similar to the discussion provided above, after completion of signaling flow 900, UE 115-*k* may have migrated a data path of its PDN-connectivity session from source AN 406-*k* to target AN 406-*l*. Thus, the PDN-connectivity session was maintained, and, after data-path migration, packets exchanged between UE 115-*k* and PDN 206-*l* via the PDN-connectivity session may be routed via target AN 406-*l* instead of via source AN 406-*k*.

The signaling described with reference to signaling flows 600, 700, 800, and/or 900 may be completed multiple times to migrate one or more additional PDN-connectivity sessions from a source AN 406 to a target AN 406. The signaling described with reference to signaling flows 600, 700, 800, and/or 900 may also be used to migrate one or more PDN-connectivity sessions from a target AN to another AN, such as a peer AN.

The example signaling flows may be altered in various ways.

The handovers described with reference to signaling flows 600 and 700 have been described as an X2 handover or an S1 handover. In signaling flows 800 and 900 a handover has been described as being performed via an SDN controller rather than an X2 interface. Other handover procedures may also be used. In additional or alternative examples, handover may involve an update of security credentials.

Further, any of the UE 115, source eNB 202 or source AN 406, and/or target eNB 202 or target AN 406 may make handover decisions. In an example, a UE 115 may proactively disconnect from a source AN 406 and reconnect at a target AN 406 based at least in part on, for example, a signal strength measurement with target AN 406 being stronger than a signal strength measurement with source AN 406. Upon handover the target AN 406 may pull information from the source AN 406 for migrating a PDN-connectivity session.

Some messages as described with reference to the signaling flows 600, 700, 800, and/or 900 may be omitted. For example, explicit messages for state removal may be omitted. Instead, state may be held in a soft state which expires after some time if not used or updated.

In the figures, the LGW has been depicted as collocated with an AN 406. LGWs may alternatively or additionally be standalone. In such a scenario, internal messages between an AN 406 and an LGW may be replaced with explicit external messages. The example wireless communications system described herein are also not constrained to a particular RAT. Example cellular RAT technologies that may be used include 3G, 4G, and 5G, as well as other RATs.

Figure 10:
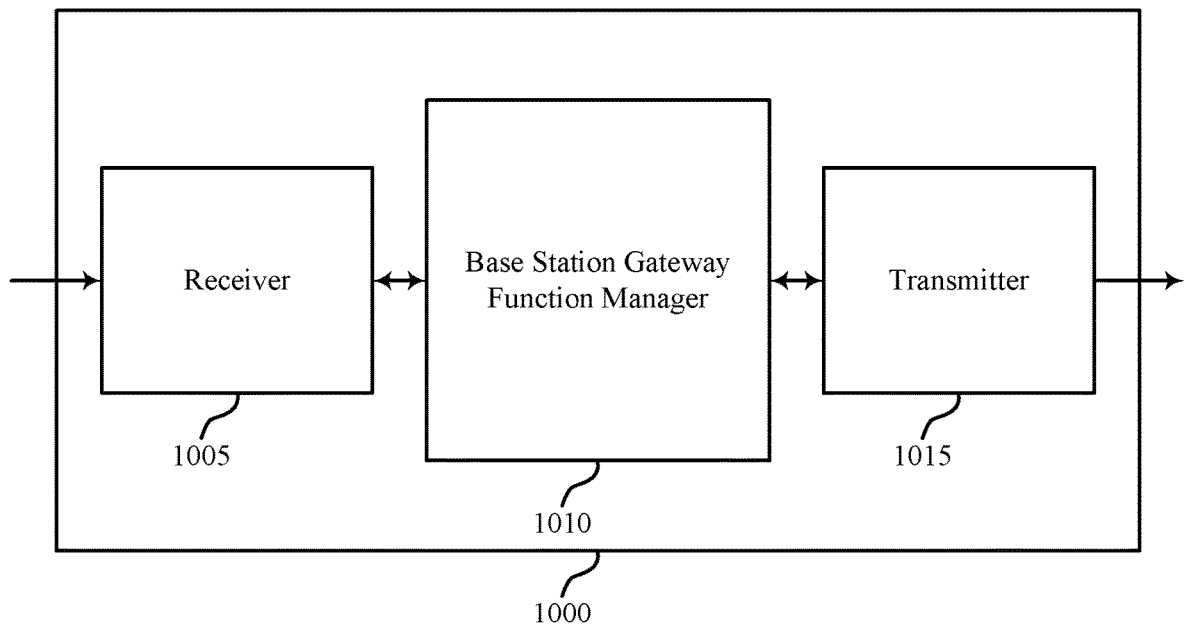
FIGS. 10 through 12 show block diagrams of a wireless device that supports migration of a local gateway function in accordance with aspects of the present disclosure.

FIG. 10 shows a block diagram of a wireless device 1000 that supports migration of a local gateway function in accordance with various aspects of the present disclosure. Wireless device 1000 may be an example of aspects of a base station 105 described with reference to FIGS. 1 and 2. Wireless device 1000 may include receiver 1005, base station gateway function manager 1010, and transmitter 1015. Wireless device 1000 may also include a processor. Each of these components may be in communication with each other.

The receiver 1005 may receive information such as packets, user data, or control information associated with various information channels (e.g., control channels, data channels, and information related to migration of a local gateway function, etc.). Information may be passed on to other components of the device. The receiver 1005 may be an example of aspects of the transceiver 1325 described with reference to FIG. 13.

The base station gateway function manager 1010 may receive a network address and information about a first data radio link associated with a PDN-connectivity session between a UE and a PDN; establish a second data radio link with the UE based at least in part on the information about the first data radio link; transmit, to the PDN, a path update including the network address and an indication of an updated path via the target AN and the second data radio link; and forward packets between the UE and the PDN via the second data radio link, where the packets include the network address and are associated with the PDN-connectivity session. The base station gateway function manager 1010 may also be an example of aspects of the base station gateway function manager 1305 described with reference to FIG. 13.

The transmitter 1015 may transmit signals received from other components of wireless device 1000. In some examples, the transmitter 1015 may be collocated with a receiver in a transceiver module. For example, the transmitter 1015 may be an example of aspects of the transceiver 1325 described with reference to FIG. 13. The transmitter 1015 may include a single antenna, or it may include a plurality of antennas.

Figure 11:
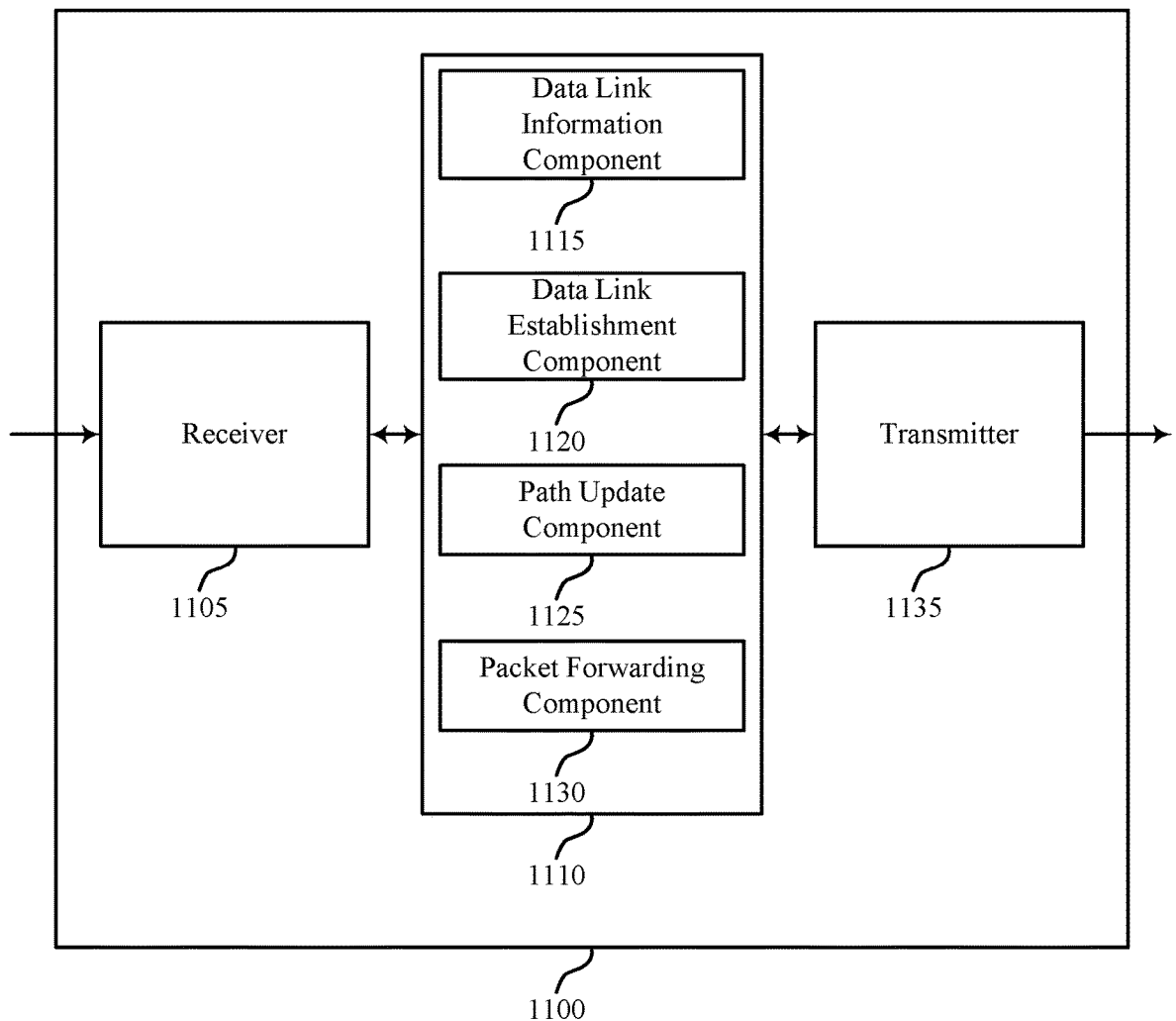

FIG. 11 shows a block diagram of a wireless device 1100 that supports migration of a local gateway function in accordance with various aspects of the present disclosure. Wireless device 1100 may be an example of aspects of a wireless device 1000 or a base station 105 described with reference to FIGS. 1, 2, and 10. Wireless device 1100 may include receiver 1105, base station gateway function manager 1110, and transmitter 1135. Wireless device 1100 may also include a processor. Each of these components may be in communication with each other.

The receiver 1105 may receive information which may be passed on to other components of the device. The receiver 1105 may also perform the functions described with reference to the receiver 1005 of FIG. 10. The receiver 1105 may be an example of aspects of the transceiver 1325 described with reference to FIG. 13.

The base station gateway function manager 1110 may be an example of aspects of base station gateway function manager 1010 described with reference to FIG. 10. The base station gateway function manager 1110 may include data link information component 1115, data link establishment component 1120, path update component 1125, and packet forwarding component 1130. The base station gateway function manager 1110 may be an example of aspects of the base station gateway function manager 1305 described with reference to FIG. 13.

The data link information component 1115 may receive a network address and information about a first data radio link associated with a PDN-connectivity session between a UE and a PDN. In some cases, the information about the first data radio link includes at least one of a security credential, a handover request, and a correlation identifier. In some cases, the information about the first data radio link is received at least in part from a peer AN or a core network.

In some cases, the network address is received from the source AN, a core network, or the UE via a signaling radio link. In some cases, the PDN is an IP network and the network address is an IP address. In some cases, the PDN is a LAN and the network address is a physical address. The data link establishment component 1120 may establish a third data radio link with a second UE, and establish a second data radio link with the UE based at least in part on the information about the first data radio link.

The path update component 1125 may transmit, to the PDN, a path update including the network address and an indication of an updated path via the target AN and the second data radio link. In some cases, the path update is sent to at least one next-hop peer AN. In some cases, the path update is one of a multicast message, a broadcast message, a routing message, and a LAN signaling message.

The packet forwarding component 1130 may communicate the packets that include the network address via the tunnel and forward packets including a second network address from the PDN to the third data radio link. In some examples, the packet forwarding component 1130 may forward, to the peer AN, information about the third data radio link and the second network address, communicate packets that include the second network address with the peer AN, and forward packets between the UE and the PDN via the second data radio link, where the packets include the network address and are associated with the PDN-connectivity session.

The transmitter 1135 may transmit signals received from other components of wireless device 1100. In some examples, the transmitter 1135 may be collocated with a receiver in a transceiver module. For example, the transmitter 1135 may be an example of aspects of the transceiver 1325 described with reference to FIG. 13. The transmitter 1135 may utilize a single antenna, or it may utilize a plurality of antennas.

Figure 12:
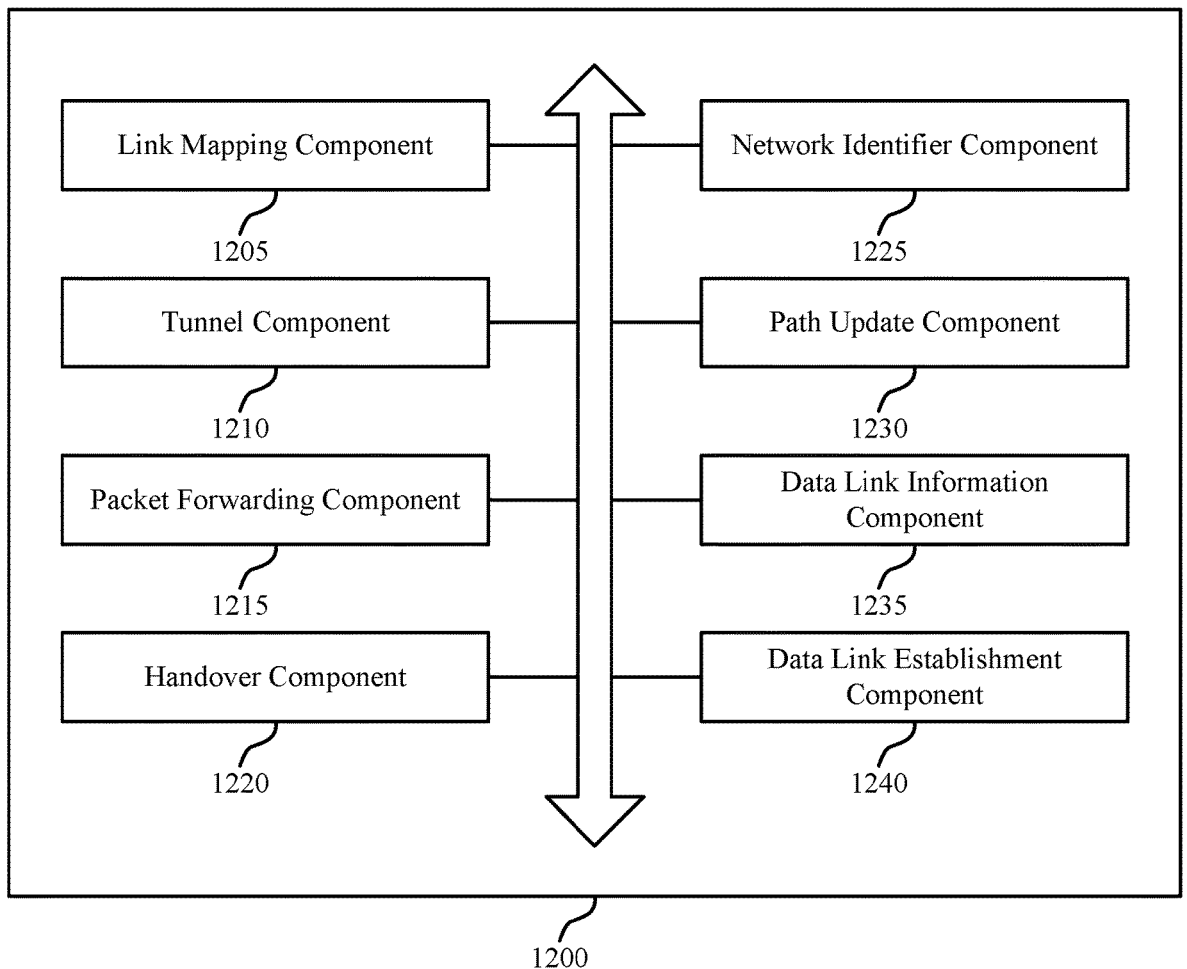

FIG. 12 shows a block diagram of a base station gateway function manager 1200 which may be an example of the corresponding component of wireless device 1000 or wireless device 1100. That is, base station gateway function manager 1200 may be an example of aspects of base station gateway function manager 1010 or base station gateway function manager 1110 described with reference to FIGS. 10 and 11. The base station gateway function manager 1200 may also be an example of aspects of the base station gateway function manager 1305 described with reference to FIG. 13.

The base station gateway function manager 1200 may include link mapping component 1205, tunnel component 1210, packet forwarding component 1215, handover component 1220, network identifier component 1225, path update component 1230, data link information component 1235, and data link establishment component 1240. Each of these modules may communicate, directly or indirectly, with one another (e.g., via one or more buses).

The link mapping component 1205 may establish a mapping between the second data radio link and the network address on a forwarding function, wherein the forwarding of the packets further includes forwarding packets including the network address between the forwarding function and the second data radio link. The tunnel component 1210 may establish a tunnel to the source AN, and establish a tunnel with the peer AN.

The packet forwarding component 1215 may communicate the packets that include the network address via the tunnel and forward packets including a second network address from the PDN to the third data radio link. In some cases, the packet forwarding component 1215 may forward, to the peer AN, information about the third data radio link and the second network address, communicate packets that include the second network address with the peer AN, and forward packets between the UE and the PDN via the second data radio link, where the packets include the network address and are associated with the PDN-connectivity session.

The handover component 1220 may determine to handover the second UE to a peer AN. The network identifier component 1225 may process a network identifier to confirm that the target AN and the peer AN are each configured to provide access to the PDN, and process a network identifier to confirm that the source AN and the target AN are each configured to provide access to the PDN.

The path update component 1230 may transmit, to the PDN, a path update including the network address and an indication of an updated path via the target AN and the second data radio link. The data link information component 1235 may receive a network address and information about a first data radio link associated with a PDN-connectivity session between a UE and a PDN. In some cases, the information about the first data radio link includes at least one of a security credential, a handover request, and a correlation identifier. In some cases, the information about the first data radio link is received at least in part from a peer AN or a core network. The data link establishment component 1240 may establish a third data radio link with a second UE, and establish a second data radio link with the UE based at least in part on the information about the first data radio link.

Figure 13:
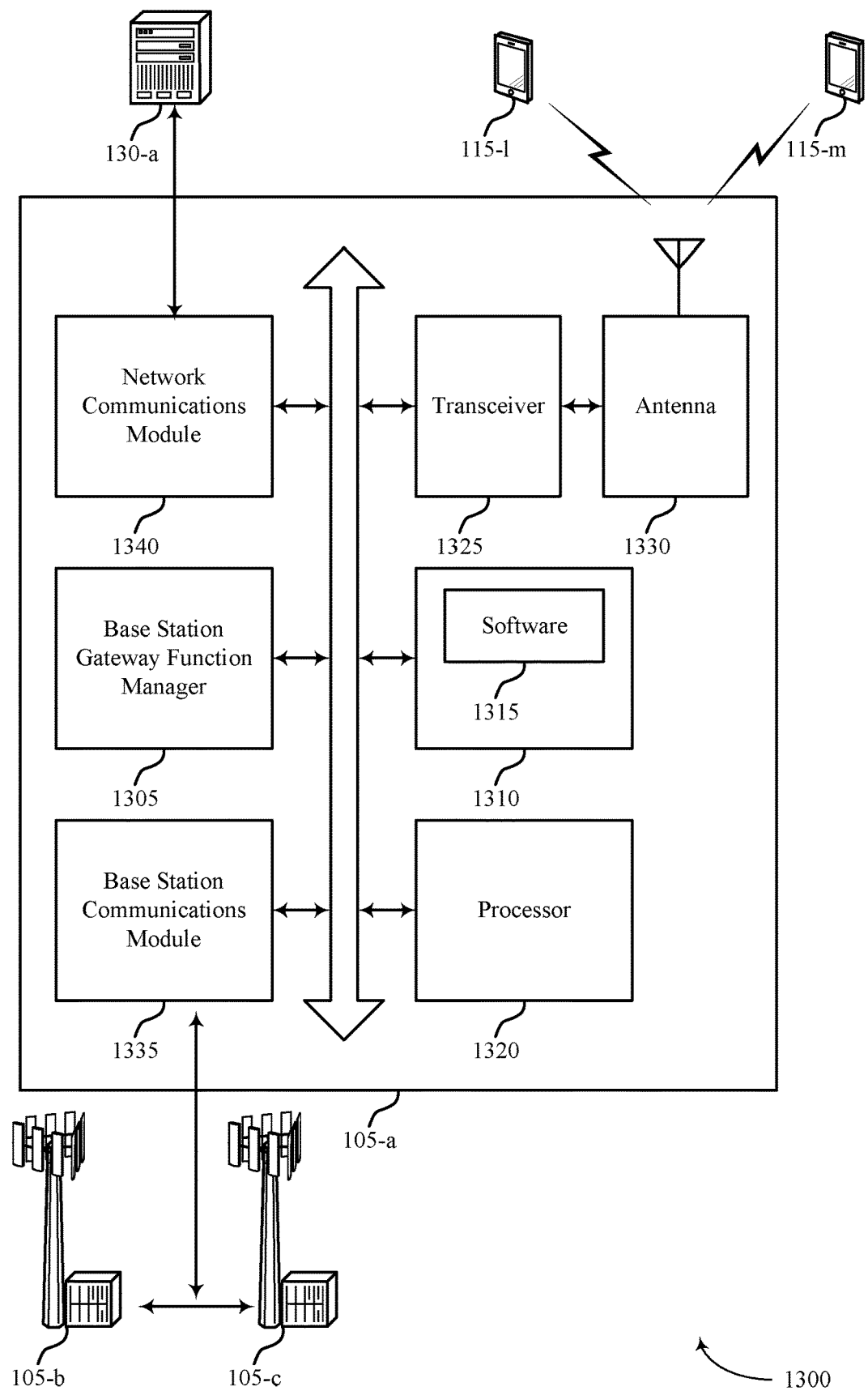
FIG. 13 illustrates a block diagram of a system including a device that supports migration of a local gateway function in accordance with aspects of the present disclosure.

FIG. 13 shows a diagram of a wireless system 1300 including a device configured that supports migration of a local gateway function in accordance with various aspects of the present disclosure. For example, system 1300 may include base station 105-*a*, which may be an example of a wireless device 1000, a wireless device 1100, or a base station 105 as described with reference to FIGS. 1, 2, and 10 through 12. Base station 105-*a* may also include components for bi-directional voice and data communications including components for transmitting communications and components for receiving communications. For example, base station 105-*a* may communicate bi-directionally with one or more UEs 115.

Base station 105-*a* may also include base station gateway function manager 1305, memory 1310, processor 1320, transceiver 1325, antenna 1330, base station communications module 1335, and network communications module 1340. Each of these modules may communicate, directly or indirectly, with one another (e.g., via one or more buses). The base station gateway function manager 1305 may be an example of a base station gateway function manager as described with reference to FIGS. 10 through 12.

The memory 1310 may include random access memory (RAM) and read only memory (ROM). The memory 1310 may store computer-readable, computer-executable software including instructions that, when executed, cause the processor to perform various functions described herein (e.g., migration of a local gateway function, etc.). In some cases, the software 1315 may not be directly executable by the processor but may cause a computer (e.g., when compiled and executed) to perform functions described herein. The processor 1320 may include an intelligent hardware device, (e.g., a central processing unit (CPU), a microcontroller, an application specific integrated circuit (ASIC), etc.).

The transceiver 1325 may communicate bi-directionally, via one or more antennas, wired, or wireless links, with one or more networks, as described above. For example, the transceiver 1325 may communicate bi-directionally with a base station 105 or a UE 115. The transceiver 1325 may also include a modem to modulate the packets and provide the modulated packets to the antennas for transmission, and to demodulate packets received from the antennas. In some cases, the wireless device may include a single antenna 1330. However, in some cases the device may have more than one antenna 1330, which may be capable of concurrently transmitting or receiving multiple wireless transmissions.

The base station communications module 1335 may manage communications with other base station 105, and may include a controller or scheduler for controlling communications with UEs 115 in cooperation with other base stations 105. For example, the base station communications module 1335 may coordinate scheduling for transmissions to UEs 115 for various interference mitigation techniques such as beamforming or joint transmission. In some examples, base station communications module 1335 may provide an X2 interface within an LTE/LTE-A wireless communication network technology to provide communication between base stations 105.

The network communications module 1340 may manage communications with the core network (e.g., via one or more wired backhaul links). For example, the network communications module 1340 may manage the transfer of data communications for client devices, such as one or more UEs 115.

Figure 14:
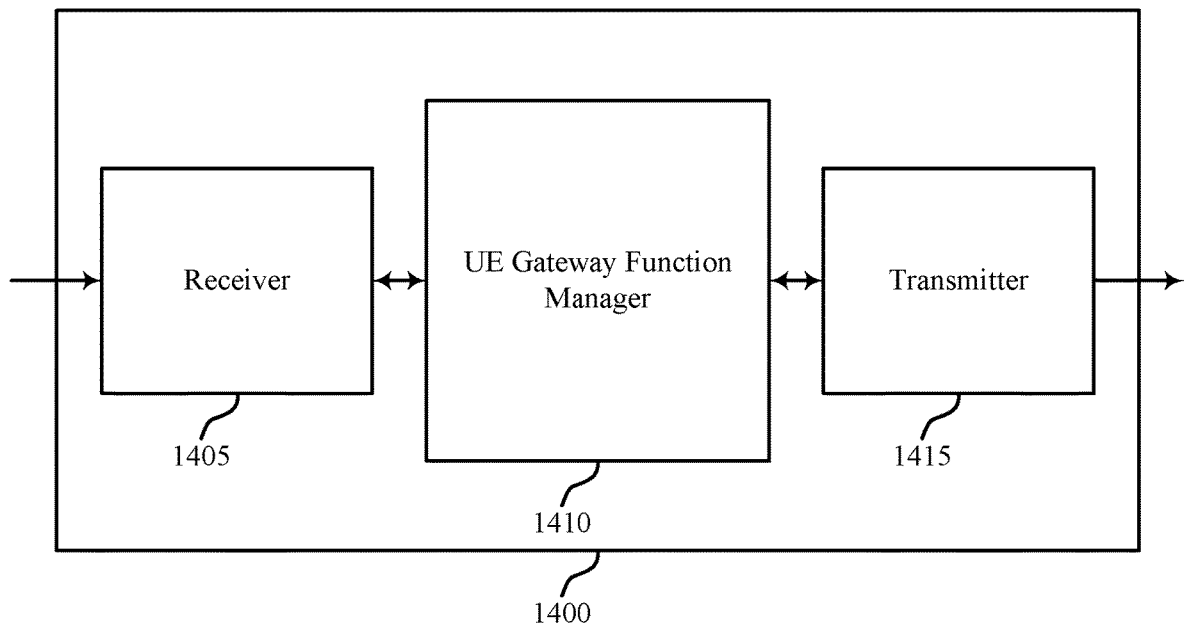
FIGS. 14 through 16 show block diagrams of a wireless device that supports migration of a local gateway function in accordance with aspects of the present disclosure.

FIG. 14 shows a block diagram of a wireless device 1400 that supports migration of a local gateway function in accordance with various aspects of the present disclosure. Wireless device 1400 may be an example of aspects of a UE 115 described with reference to FIGS. 1 and 2. Wireless device 1400 may include receiver 1405, UE gateway function manager 1410, and transmitter 1415. Wireless device 1400 may also include a processor. Each of these components may be in communication with each other.

The receiver 1405 may receive information such as packets, user data, or control information associated with various information channels (e.g., control channels, data channels, and information related to migration of a local gateway function, etc.). Information may be passed on to other components of the device. The receiver 1405 may be an example of aspects of the transceiver 1725 described with reference to FIG. 17.

The UE gateway function manager 1410 may establish a first data radio link with a source AN; establish a connectivity session with a PDN via the first data radio link, where the connectivity session is associated with a network address; establish a second data radio link with a target AN based at in least in part on a signal strength measurement for each of the source AN and the target AN; and communicate packets that include the network address via the second data radio link using the connectivity session established with the PDN. The UE gateway function manager 1410 may also be an example of aspects of the UE gateway function manager 1705 described with reference to FIG. 17.

The transmitter 1415 may transmit signals received from other components of wireless device 1400. In some examples, the transmitter 1415 may be collocated with a receiver in a transceiver module. For example, the transmitter 1415 may be an example of aspects of the transceiver 1725 described with reference to FIG. 17. The transmitter 1415 may include a single antenna, or it may include a plurality of antennas.

Figure 15:
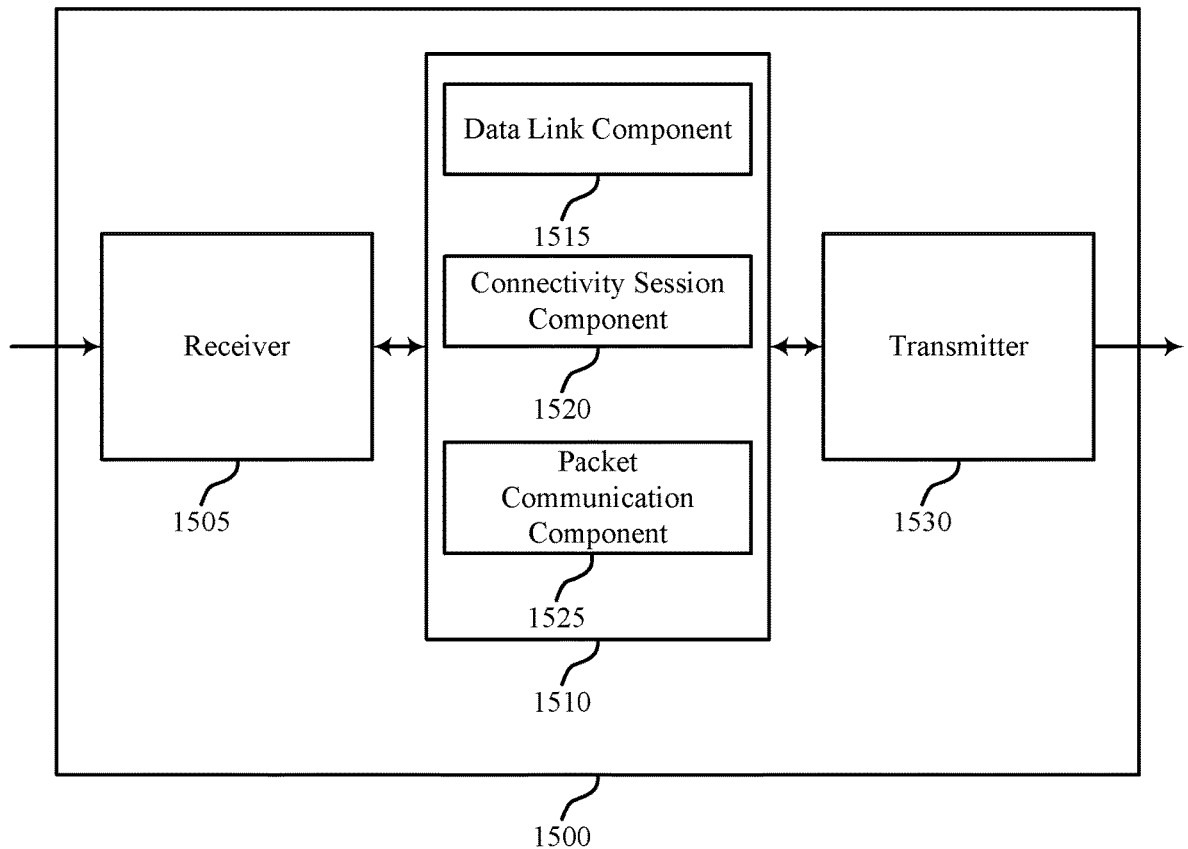

FIG. 15 shows a block diagram of a wireless device 1500 that supports migration of a local gateway function in accordance with various aspects of the present disclosure. Wireless device 1500 may be an example of aspects of a wireless device 1400 or a UE 115 described with reference to FIGS. 1, 2, and 14. Wireless device 1500 may include receiver 1505, UE gateway function manager 1510, and transmitter 1530. Wireless device 1500 may also include a processor. Each of these components may be in communication with each other.

The receiver 1505 may receive information which may be passed on to other components of the device. The receiver 1505 may also perform the functions described with reference to the receiver 1405 of FIG. 14. The receiver 1505 may be an example of aspects of the transceiver 1725 described with reference to FIG. 17.

The UE gateway function manager 1510 may be an example of aspects of UE gateway function manager 1410 described with reference to FIG. 14. The UE gateway function manager 1510 may include data link component 1515, connectivity session component 1520, and packet communication component 1525. The UE gateway function manager 1510 may be an example of aspects of the UE gateway function manager 1705 described with reference to FIG. 17.

The data link component 1515 may establish a first data radio link with a source AN, and establish a second data radio link with a target AN based at in least in part on a signal strength measurement for each of the source AN and the target AN. The connectivity session component 1520 may establish a connectivity session with a PDN via the first data radio link, where the connectivity session is associated with a network address. In some cases, the PDN is an IP network and the network address is an IP address. In some cases, the PDN is a LAN and the network address is a physical address. The packet communication component 1525 may communicate packets that include the network address via the second data radio link using the connectivity session established with the PDN.

The transmitter 1530 may transmit signals received from other components of wireless device 1500. In some examples, the transmitter 1530 may be collocated with a receiver in a transceiver module. For example, the transmitter 1530 may be an example of aspects of the transceiver 1725 described with reference to FIG. 17. The transmitter 1530 may utilize a single antenna, or it may utilize a plurality of antennas.

Figure 16:
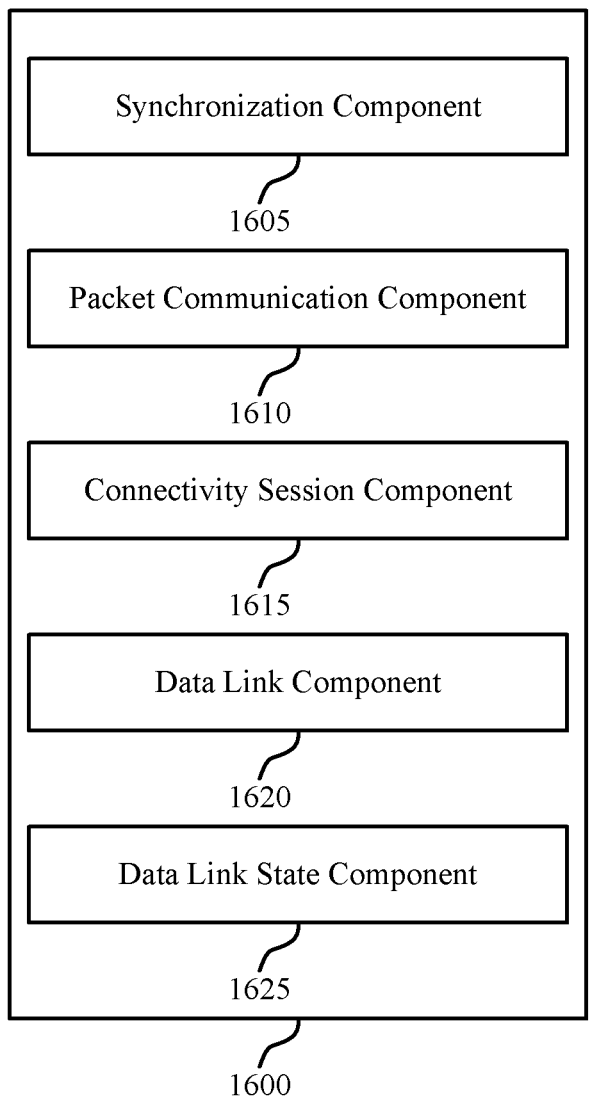

FIG. 16 shows a block diagram of a UE gateway function manager 1600 which may be an example of the corresponding component of wireless device 1400 or wireless device 1500. That is, UE gateway function manager 1600 may be an example of aspects of UE gateway function manager 1410 or UE gateway function manager 1510 described with reference to FIGS. 14 and 15. The UE gateway function manager 1600 may also be an example of aspects of the UE gateway function manager 1705 described with reference to FIG. 17.

The UE gateway function manager 1600 may include synchronization component 1605, packet communication component 1610, connectivity session component 1615, data link component 1620 and data link state component 1625. Each of these modules may communicate, directly or indirectly, with one another (e.g., via one or more buses).

In some cases, the establishing of the second data radio link with the target AN further includes synchronizing with the target AN, which may, for example, be performed by the synchronization component 1605. The packet communication component 1610 may communicate packets that include the network address via the second data radio link using the connectivity session established with the PDN.

The connectivity session component 1615 may establish a connectivity session with a PDN via the first data radio link, where the connectivity session is associated with a network address. The data link component 1620 may establish a first data radio link with a source AN, and establish a second data radio link with a target AN based at in least in part on a signal strength measurement for each of the source AN and the target AN. In some cases, the establishing of the second data radio link with the target AN further includes transmitting a state of the first data radio link to the target AN, and may, for example, be performed by the data link state component 1625.

Figure 17:
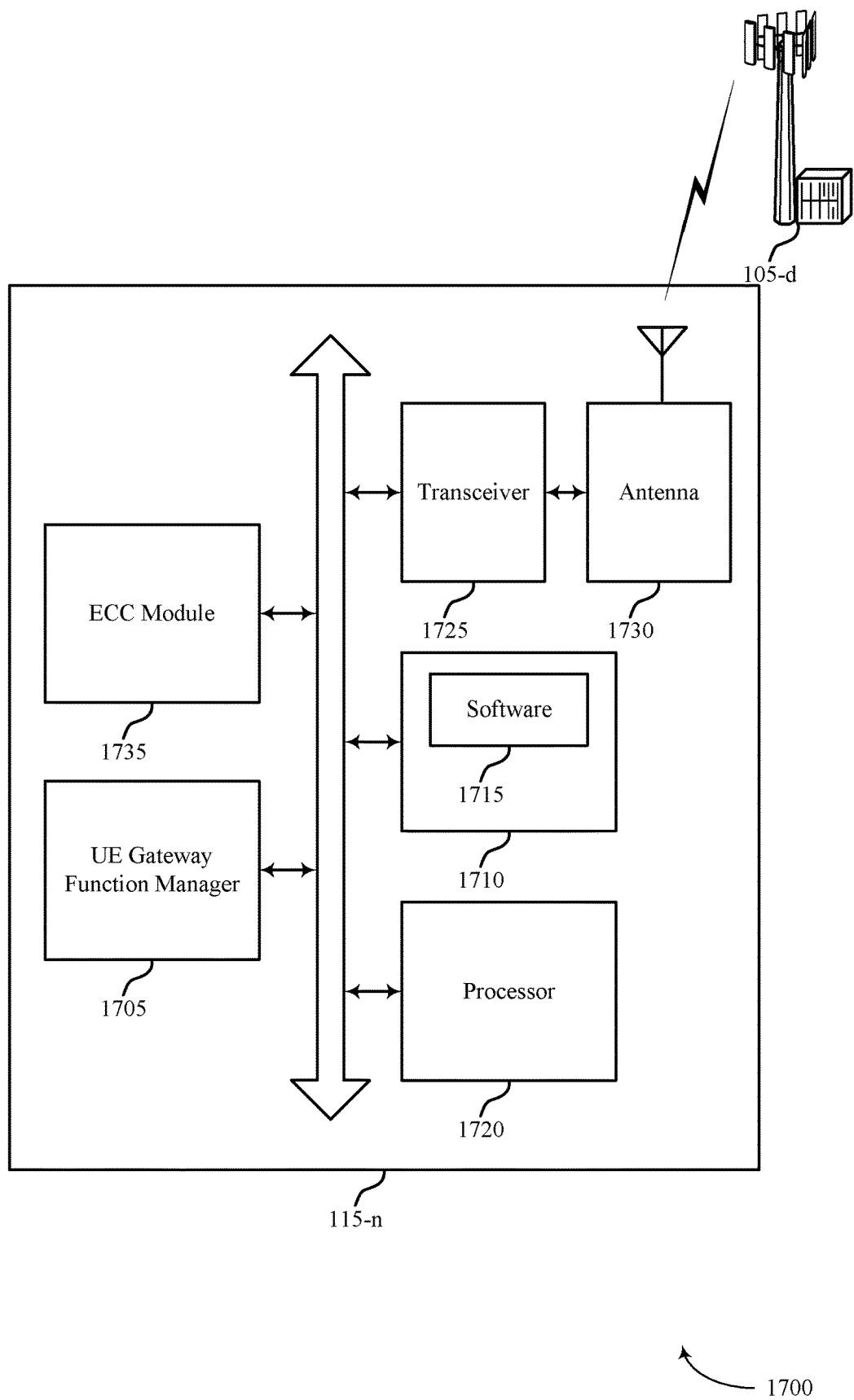
FIG. 17 illustrates a block diagram of a system including a user equipment (UE) that supports migration of a local gateway function in accordance with aspects of the present disclosure.

FIG. 17 shows a diagram of a system 1700 including a device that supports migration of a local gateway function in accordance with various aspects of the present disclosure. For example, system 1700 may include UE 115-*n*, which may be an example of a wireless device 1400, a wireless device 1500, or a UE 115 as described with reference to FIGS. 1, 2, and 14 through 16.

UE 115-*n* may also include UE gateway function manager 1705, memory 1710, processor 1720, transceiver 1725, antenna 1730, and ECC module 1735. Each of these modules may communicate, directly or indirectly, with one another (e.g., via one or more buses). The UE gateway function manager 1705 may be an example of a UE gateway function manager as described with reference to FIGS. 14 through 16.

The memory 1710 may include RAM and ROM. The memory 1710 may store computer-readable, computer-executable software including instructions that, when executed, cause the processor to perform various functions described herein (e.g., migration of a local gateway function, etc.). In some cases, the software 1715 may not be directly executable by the processor but may cause a computer (e.g., when compiled and executed) to perform functions described herein. The processor 1720 may include an intelligent hardware device, (e.g., a CPU, a microcontroller, an ASIC, etc.).

The transceiver 1725 may communicate bi-directionally, via one or more antennas, wired, or wireless links, with one or more networks, as described above. For example, the transceiver 1725 may communicate bi-directionally with a base station 105 or a UE 115. The transceiver 1725 may also include a modem to modulate the packets and provide the modulated packets to the antennas for transmission, and to demodulate packets received from the antennas. In some cases, the wireless device may include a single antenna 1730. However, in some cases the device may have more than one antenna 1330, which may be capable of concurrently transmitting or receiving multiple wireless transmissions. ECC module 1735 may enable operations using enhanced component carriers (eCCs) such as communication using shared or unlicensed spectrum, using reduced TTIs or subframe durations, or using a large number of component carriers.

Figure 18:
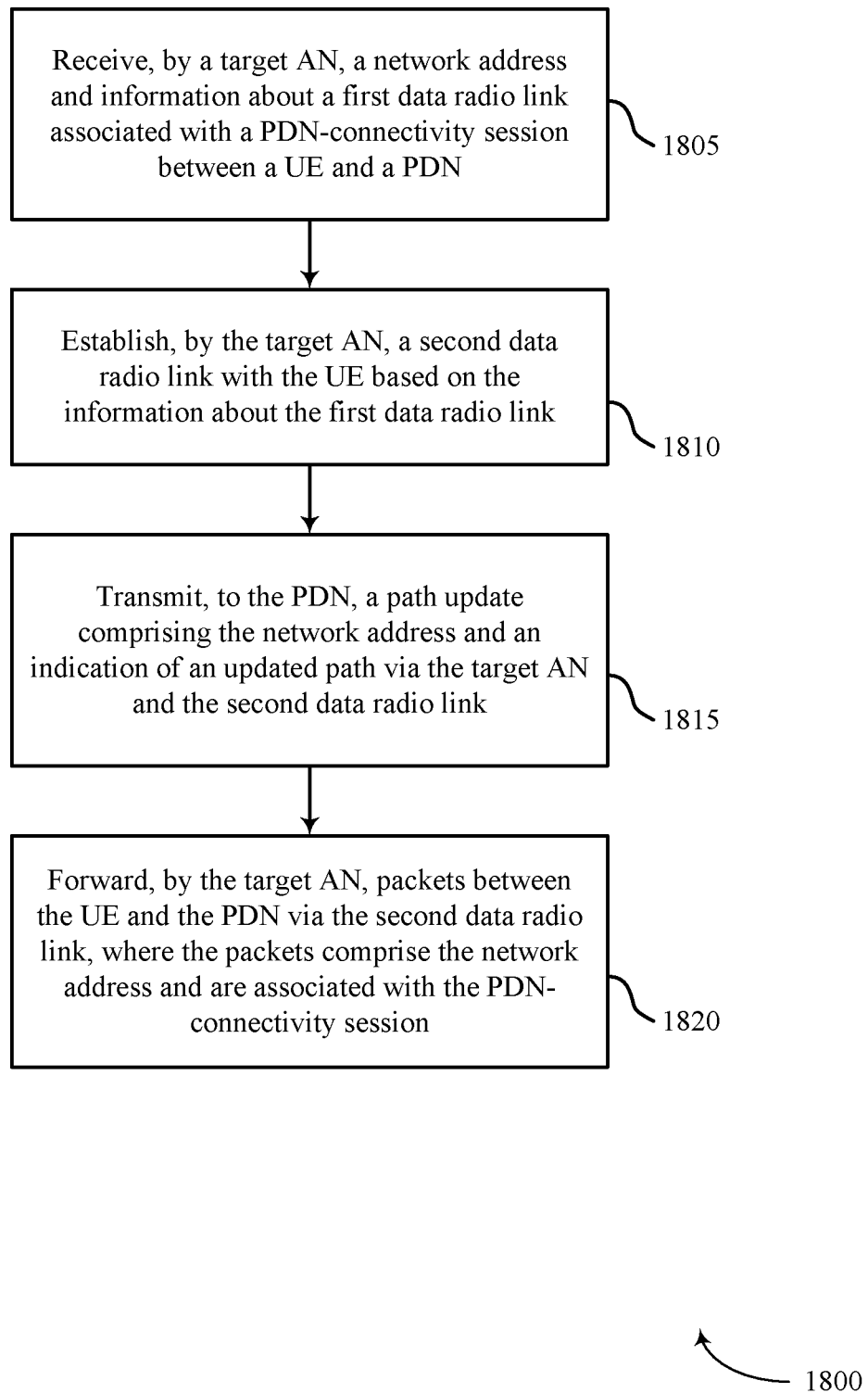
FIGS. 18 through 21 illustrate methods for migration of a local gateway function in accordance with aspects of the present disclosure.

FIG. 18 shows a flowchart illustrating a method 1800 for migration of a local gateway function in accordance with various aspects of the present disclosure. The operations of method 1800 may be implemented by a device such as a base station 105 or its components as described with reference to FIGS. 1 and 2. For example, the operations of method 1800 may be performed by the base station gateway function manager as described herein. In some examples, the base station 105 may execute a set of codes to control the functional elements of the device to perform the functions described below. Additionally or alternatively, the base station 105 may perform aspects of the functions described below using special-purpose hardware.

At block 1805, the base station 105 may receive a network address and information about a first data radio link associated with a PDN-connectivity session between a UE and a PDN as described above with reference to FIGS. 2 through 9. In certain examples, the operations of block 1805 may be performed by the data link information component as described with reference to FIGS. 11 and 12.

At block 1810, the base station 105 may establish a second data radio link with the UE based at least in part on the information about the first data radio link as described above with reference to FIGS. 2 through 9. In certain examples, the operations of block 1810 may be performed by the data link establishment component as described with reference to FIGS. 11 and 12.

At block 1815, the base station 105 may transmit, to the PDN, a path update including the network address and an indication of an updated path via the target AN and the second data radio link as described above with reference to FIGS. 2 through 9. In certain examples, the operations of block 1815 may be performed by the path update component as described with reference to FIGS. 11 and 12.

At block 1820, the base station 105 may forward packets between the UE and the PDN via the second data radio link, where the packets include the network address and are associated with the PDN-connectivity session as described above with reference to FIGS. 2 through 9. In certain examples, the operations of block 1820 may be performed by the packet forwarding component as described with reference to FIGS. 11 and 12.

Figure 19:
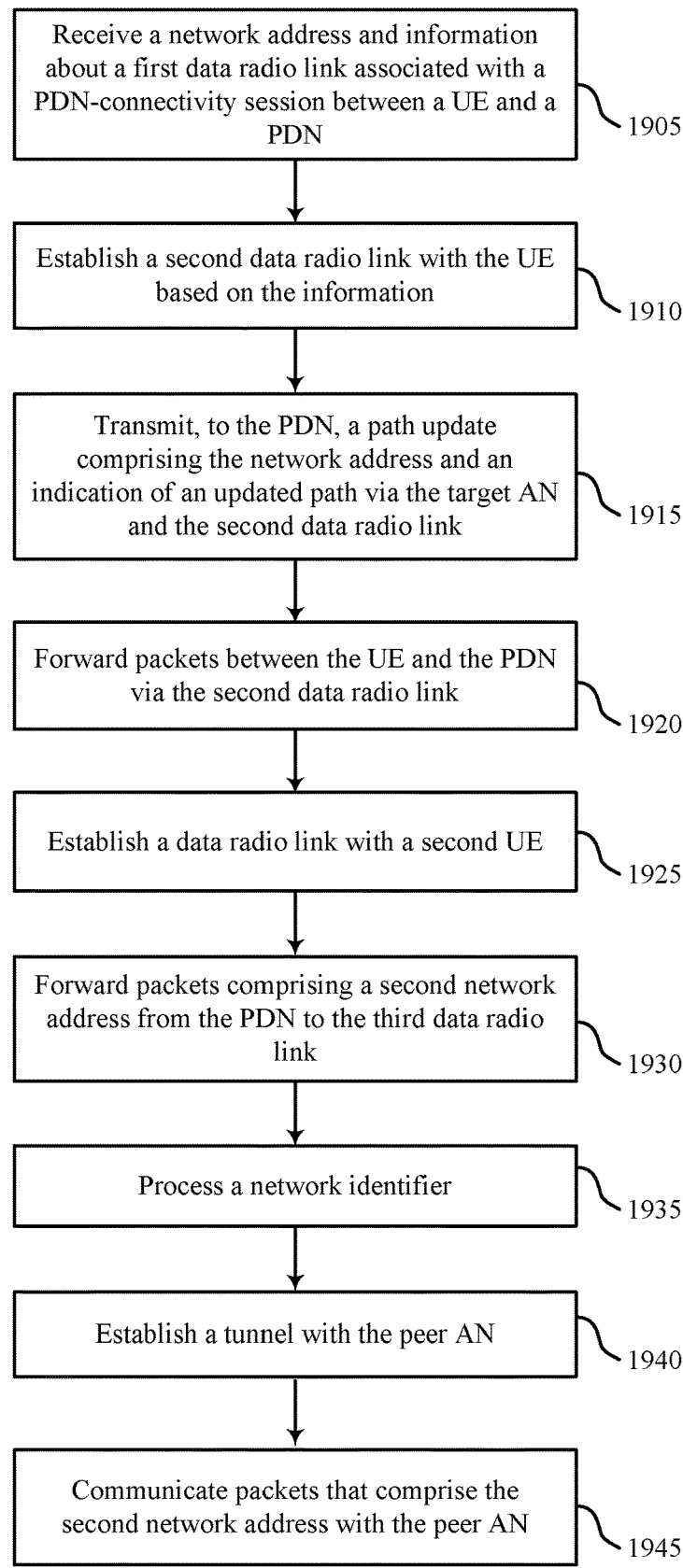

FIG. 19 shows a flowchart illustrating a method 1900 for migration of a local gateway function in accordance with various aspects of the present disclosure. The operations of method 1900 may be implemented by a device such as a base station 105 or its components as described with reference to FIGS. 1 and 2. For example, the operations of method 1900 may be performed by the base station gateway function manager as described herein. In some examples, the base station 105 may execute a set of codes to control the functional elements of the device to perform the functions described below. Additionally or alternatively, the base station 105 may perform aspects of the functions described below using special-purpose hardware.

At block 1905, the base station 105 may receive a network address and information about a first data radio link associated with a PDN-connectivity session between a UE and a PDN as described above with reference to FIGS. 2 through 9. In certain examples, the operations of block 1905 may be performed by the data link information component as described with reference to FIGS. 11 and 12.

At block 1910, the base station 105 may establish a second data radio link with the UE based at least in part on the information about the first data radio link as described above with reference to FIGS. 2 through 9. In certain examples, the operations of block 1910 may be performed by the data link establishment component as described with reference to FIGS. 11 and 12.

At block 1915, the base station 105 may transmit, to the PDN, a path update including the network address and an indication of an updated path via the target AN and the second data radio link as described above with reference to FIGS. 2 through 9. In certain examples, the operations of block 1915 may be performed by the path update component as described with reference to FIGS. 11 and 12.

At block 1920, the base station 105 may forward packets between the UE and the PDN via the second data radio link, where the packets include the network address and are associated with the PDN-connectivity session as described above with reference to FIGS. 2 through 9. In certain examples, the operations of block 1920 may be performed by the packet forwarding component as described with reference to FIGS. 11 and 12.

At block 1925, the base station 105 may establish a third data radio link with a second UE as described above with reference to FIGS. 2 through 9. In certain examples, the operations of block 1925 may be performed by the data link establishment component as described with reference to FIGS. 11 and 12.

At block 1930, the base station 105 may forward packets including a second network address from the PDN to the third data radio link as described above with reference to FIGS. 2 through 9. In certain examples, the operations of block 1930 may be performed by the packet forwarding component as described with reference to FIGS. 11 and 12.

At block 1935, the base station 105 may process a network identifier to confirm that the target AN and the peer AN are each configured to provide access to the PDN as described above with reference to FIGS. 2 through 9. In certain examples, the operations of block 1935 may be performed by the network identifier component as described with reference to FIGS. 11 and 12.

At block 1940, the base station 105 may establish a tunnel with the peer AN as described above with reference to FIGS. 2 through 9. In certain examples, the operations of block 1940 may be performed by the tunnel component as described with reference to FIGS. 11 and 12.

At block 1945, the base station 105 may communicate packets that include the second network address with the peer AN as described above with reference to FIGS. 2 through 9. In certain examples, the operations of block 1945 may be performed by the packet forwarding component as described with reference to FIGS. 11 and 12.

Figure 20:
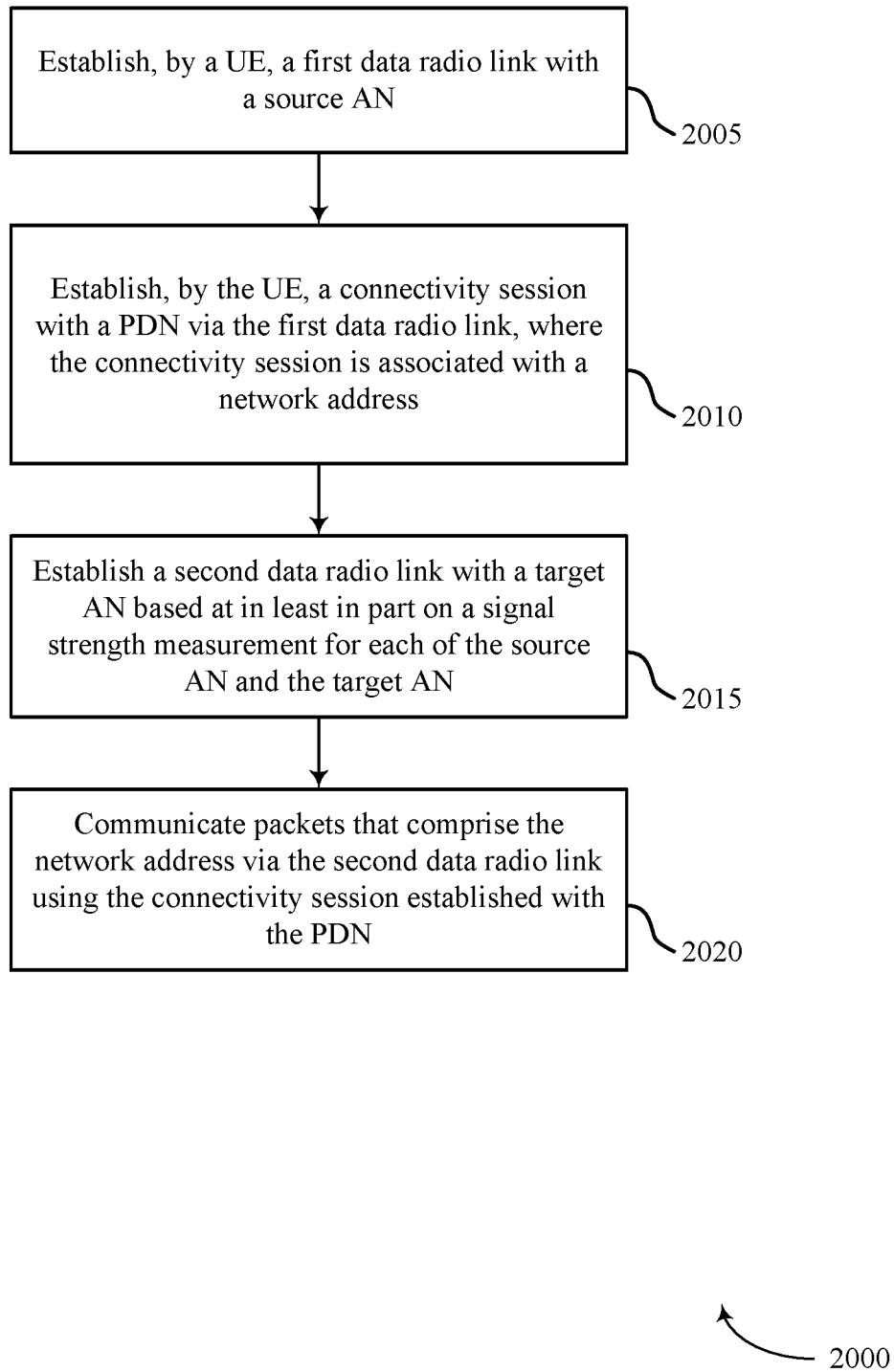

FIG. 20 shows a flowchart illustrating a method 2000 for migration of a local gateway function in accordance with various aspects of the present disclosure. The operations of method 2000 may be implemented by a device such as a UE 115 or its components as described with reference to FIGS. 1 and 2. For example, the operations of method 2000 may be performed by the UE gateway function manager as described herein. In some examples, the UE 115 may execute a set of codes to control the functional elements of the device to perform the functions described below. Additionally or alternatively, the UE 115 may perform aspects of the functions described below using special-purpose hardware.

At block 2005, the UE 115 may establish a first data radio link with a source AN as described above with reference to FIGS. 2 through 9. In certain examples, the operations of block 2005 may be performed by the data link component as described with reference to FIGS. 15 and 16.

At block 2010, the UE 115 may establish a connectivity session with a PDN via the first data radio link, where the connectivity session is associated with a network address as described above with reference to FIGS. 2 through 9. In certain examples, the operations of block 2010 may be performed by the connectivity session component as described with reference to FIGS. 15 and 16.

At block 2015, the UE 115 may establish a second data radio link with a target AN based at in least in part on a signal strength measurement for each of the source AN and the target AN as described above with reference to FIGS. 2 through 9. In certain examples, the operations of block 2015 may be performed by the data link component as described with reference to FIGS. 15 and 16.

At block 2020, the UE 115 may communicate packets that include the network address via the second data radio link using the connectivity session established with the PDN as described above with reference to FIGS. 2 through 9. In certain examples, the operations of block 2020 may be performed by the packet communication component as described with reference to FIGS. 15 and 16.

Figure 21:
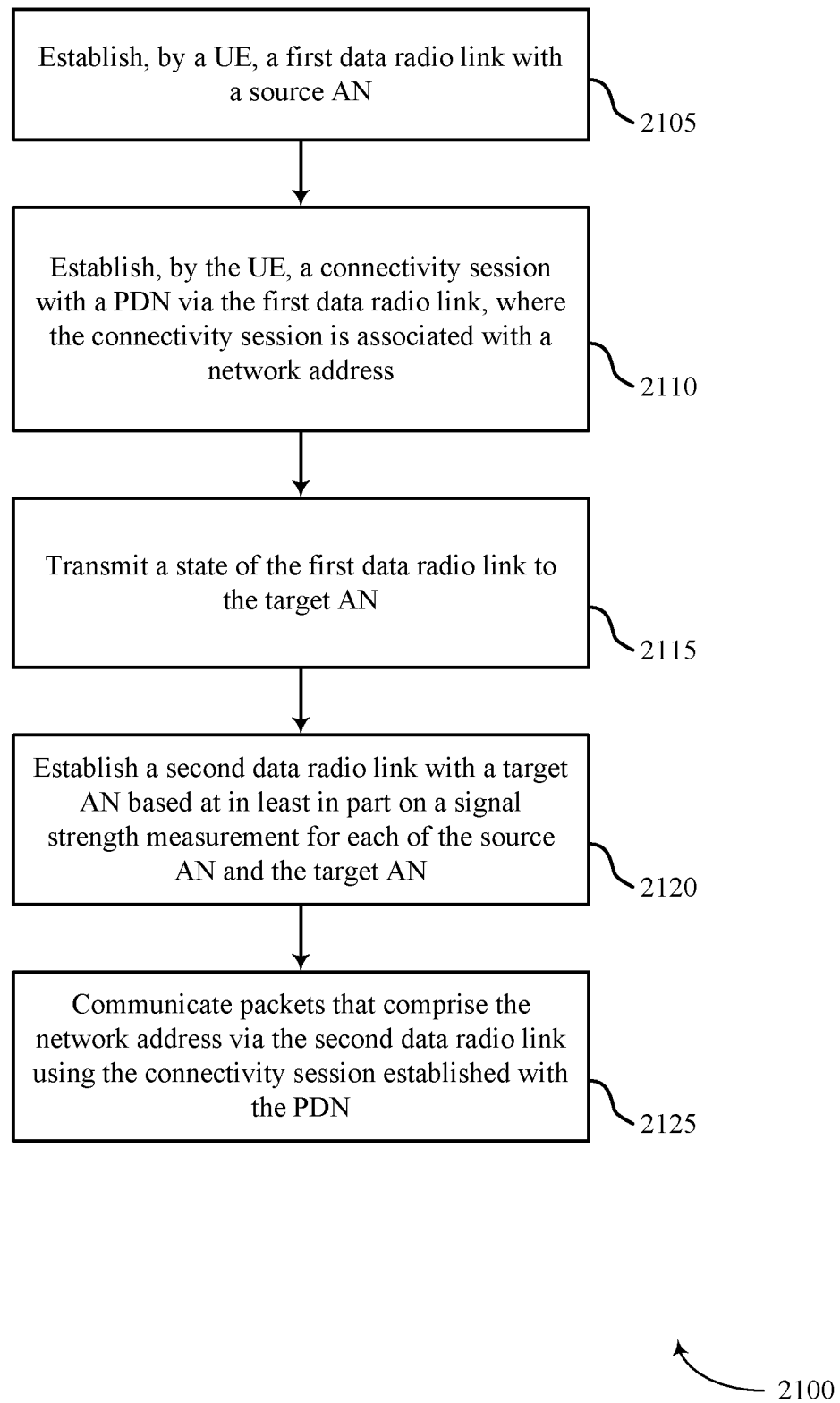

FIG. 21 shows a flowchart illustrating a method 2100 for migration of a local gateway function in accordance with various aspects of the present disclosure. The operations of method 2100 may be implemented by a device such as a UE 115 or its components as described with reference to FIGS. 1 and 2. For example, the operations of method 2100 may be performed by the UE gateway function manager as described herein. In some examples, the UE 115 may execute a set of codes to control the functional elements of the device to perform the functions described below. Additionally or alternatively, the UE 115 may perform aspects of the functions described below using special-purpose hardware.

At block 2105, the UE 115 may establish a first data radio link with a source AN as described above with reference to FIGS. 2 through 9. In certain examples, the operations of block 2105 may be performed by the data link component as described with reference to FIGS. 15 and 16.

At block 2110, the UE 115 may establish a connectivity session with a PDN via the first data radio link, where the connectivity session is associated with a network address as described above with reference to FIGS. 2 through 9. In certain examples, the operations of block 2110 may be performed by the connectivity session component as described with reference to FIGS. 15 and 16.

At block 2115, the UE 115 may transmit a state of the first data radio link to the target AN as described above with reference to FIGS. 2 through 9. In certain examples, the operations of block 2115 may be performed by the data link state component as described with reference to FIGS. 15 and 16.

At block 2120, the UE 115 may establish a second data radio link with a target AN based at in least in part on a signal strength measurement for each of the source AN and the target AN as described above with reference to FIGS. 2 through 9. In certain examples, the operations of block 2120 may be performed by the data link component as described with reference to FIGS. 15 and 16.

At block 2125, the UE 115 may communicate packets that include the network address via the second data radio link using the connectivity session established with the PDN as described above with reference to FIGS. 2 through 9. In certain examples, the operations of block 2125 may be performed by the packet communication component as described with reference to FIGS. 15 and 16.

It should be noted that the methods 1800, 1900, 2000, or 2100 are just example implementations, and that the operations of the methods 1800, 1900, 2000, or 2100 may be rearranged or otherwise modified such that other implementations are possible. In some examples, aspects from two or more of the methods 1800, 1900, 2000, or 2100 described with reference to FIGS. 18, 19, 20, and 21 may be combined. For example, aspects of each of the methods may include steps or aspects of the other methods, or other steps or techniques described herein. Thus, aspects of the disclosure may provide for migration of a local gateway function.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as code division multiple access (CDMA), time division multiple access (TDMA), frequency division multiple access (FDMA), orthogonal frequency-division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for migration of a local gateway function. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:
1. A method of wireless communication comprising:
receiving, by a target access node (AN) associated with a first gateway local to the target AN and from a source AN associated with a second gateway local to the source AN, a packet data network (PDN) address for a user equipment (UE) that is for a first data session between the UE and a packet data network (PDN) via the source AN and the second gateway;
processing the PDN address to confirm that the source AN and the target AN are each configured to provide access to the PDN, wherein the source AN is configured to exchange packets with the UE via the first data session;
determining, by the target AN based at least in part on processing the PDN address for the UE, to establish a second data session with the UE via the target AN and the first gateway based at least in part on the received PDN address for the UE that is for the first data session between the UE and the PDN; and
transmitting a request to a network node to establish, at the target AN, the second data session corresponding to the first data session.

2. The method of claim 1, further comprising:
establishing, by the target AN, a data radio link with the UE based at least in part on the PDN address for the first data session;
transmitting, to the PDN, a path update comprising the PDN address of the UE, an indication of an updated path via the target AN, and information about the data radio link; and
forwarding, by the target AN, packets comprising the PDN address between the UE and the PDN via the data radio link.

3. The method of claim 2, wherein the path update is one of a multicast message, a broadcast message, a routing message, and a local area network (LAN) signaling message.

4. The method of claim 1, further comprising:
establishing a tunnel to the source AN; and
receiving packets that comprise the PDN address of the UE via the tunnel.

5. The method of claim 1, further comprising:
establishing a data radio link with a second UE; and
forwarding packets comprising a PDN address of the second UE to the data radio link.

6. The method of claim 5, further comprising:
determining to handover the second UE to a peer AN; and
forwarding, to the peer AN, information about the data radio link and the PDN address of the second UE.

7. The method of claim 6, further comprising:
processing the PDN address to confirm that the target AN and the peer AN are each configured to provide access to the PDN;
establishing a tunnel with the peer AN; and
forwarding packets that comprise the PDN address of the second UE to the peer AN via the tunnel.

8. The method of claim 1, wherein the PDN address for the first data session is received from the source AN, a core network, or the UE via a signaling radio link.

9. The method of claim 1, wherein the first gateway comprises a first local gateway (L-GW), or a first forwarding element, or a first forwarding node carrying forwarding information base entries, and the second gateway comprises a second L-GW, or a second forwarding element, or a second forwarding node carrying forwarding information base entries.

10. An apparatus for wireless communication, comprising:
a processor; a memory coupled with the processor, wherein the memory comprises instructions executable by the processor to cause the apparatus to:
receive, by a target access node (AN) associated with a first gateway local to the target AN and from a source AN associated with a second gateway local to the source AN, a packet data network (PDN) address for a user equipment (UE) that is for a first data session between the UE and a packet data network (PDN) via the source AN and the second gateway;
process the PDN address to confirm that the source AN and the target AN are each configured to provide access to the PDN, wherein the source AN is configured to exchange packets with the UE via the first data session;
determine, by the target AN, to establish a second data session with the UE via the target AN and the first gateway based at least in part on the processed PDN address for the UE that is for the first data session between the UE and the PDN; and
transmit a request to a network node to establish, at the target AN, the second data session corresponding to the first data session.

11. The apparatus of claim 10, wherein the instructions are operable executable to cause the processor to:
establish, by the target AN, a data radio link with the UE based at least in part on the PDN address for the first data session;
transmit, to the PDN, a path update comprising the PDN address of the UE, an indication of an updated path via the target AN, and information about the data radio link; and
forward, by the target AN, packets comprising the PDN address between the UE and the PDN via the data radio link.

12. The apparatus of claim 11, wherein the path update is one of a multicast message, a broadcast message, a routing message, and a local area network (LAN) signaling message.

13. The apparatus of claim 10, wherein the instructions are executable to cause the processor to:
establish a tunnel to the source AN; and
receive packets that comprise the PDN address of the UE via the tunnel.

14. The apparatus of claim 10, wherein the instructions are executable to cause the processor to:
establish a data radio link with a second UE; and
forward packets comprising a PDN address of the second UE to the data radio link.

15. The apparatus of claim 14, wherein the instructions are executable to cause the processor to:
determine to handover the second UE to a peer AN; and
forward, to the peer AN, information about the data radio link and the PDN address of the second UE.

16. The apparatus of claim 15, wherein the instructions are executable to cause the processor to:
process the PDN address to confirm that the target AN and the peer AN are each configured to provide access to the PDN;
establish a tunnel with the peer AN; and
forward packets that comprise the PDN address of the second UE to the peer AN via the tunnel.

17. The apparatus of claim 10, wherein the PDN address for the first data session is received from the source AN, a core network, or the UE via a signaling radio link.

18. A method of wireless communication comprising:
establishing, by a source access node (AN), a data radio link with a user equipment (UE);
determining, by the source AN, to perform a handover procedure of a first data session to a target AN associated with a first gateway local to the target AN, the first data session between the UE and a packet data network (PDN) via the source AN and a second gateway associated with and local to the source AN, and the first data session using the data radio link;
processing a PDN address to confirm that the source AN and the target AN are each configured to provide access to the PDN, wherein the source AN is configured to exchange packets with the UE via the first data session;
transmitting, by the source AN to the target AN, the PDN address for the UE that is for the first data session between the UE and the PDN; and
receiving, from a network node based at least in part on transmitting the PDN address, a PDN path update message for a second data session with the UE via the target AN and the first gateway, the second data session corresponding to the first data session.

19. The method of claim 18, further comprising:
receiving a measurement report from the UE, wherein determining to perform the handover procedure is based at least in part on the measurement report.

20. The method of claim 19, wherein the measurement report indicates one or more measurements performed by the UE, the one or more measurements comprising signal strength measurements corresponding to signals communicated between the source AN and the UE and signals communicated between the target AN and the UE.

21. The method of claim 18, wherein transmitting the PDN address comprises:
transmitting a handover request comprising the PDN address.

22. The method of claim 21, further comprising:
receiving, from the target AN based at least in part on transmitting the handover request, a handover request acknowledgement message comprising a state for radio bearer establishment, one or more tunnel endpoint identifiers, or a combination thereof.

23. The method of claim 22, further comprising:
transmitting, to the UE based at least in part on receiving the handover request acknowledgment message, a radio resource control connection reconfiguration request message comprising the state for radio bearer establishment, the one or more tunnel endpoint identifiers, or a combination thereof.

24. The method of claim 18, further comprising:
receiving, from the network node, a context release command;
removing, from the source AN based at least in part on receiving the context release command, a state of a data radio bearer associated with the first data session;
transmitting, to the network node based at least in part on receiving the context release command, a release complete message indicating the removing of the state of the data radio bearer.

25. The method of claim 24, further comprising:
receiving, from the network node via the second gateway, a delete session request message instructing the source AN to delete a FIB state for the UE;
deleting, from the source AN based at least in part on receiving the delete session request, the PDN address for the UE; and
transmitting, to the network node via the second gateway based at least in part on receiving the delete session request message, a delete session response message indicating the deleting the PDN address.

26. The method of claim 18, further comprising:
establishing a tunnel with the target AN; and
transmitting, to the target AN, one or more packets that comprise the PDN address of the UE via the tunnel.

27. The method of claim 18, wherein the PDN address for the first data session is transmitted to the target AN via a signaling radio link.

28. An apparatus for wireless communication, comprising:
a processor; a memory coupled with the processor, wherein the memory comprises instructions executable by the processor to cause the apparatus to:
establish, by a source access node (AN), a data radio link with a user equipment (UE);
determine, by the source AN, to perform a handover procedure of a first data session to a target AN associated with a first gateway local to the target AN, the first data session between the UE and a packet data network (PDN) via the source AN and a second gateway associated with and local to the source AN, and the first data session using the data radio link;
process a PDN address to confirm that the source AN and the target AN are each configured to provide access to the PDN, wherein the source AN is configured to exchange packets with the UE via the first data session;
transmit, by the source AN to the target AN, the PDN address for the UE that is for the first data session between the UE and the PDN; and
receive, from a network node based at least in part on transmitting the PDN address, a PDN path update message for a second data session with the UE via the target AN and the first gateway, the second data session corresponding to the first data session.

* * * * *